(12) United States Patent
Ota et al.

(10) Patent No.: US 10,739,884 B2
(45) Date of Patent: Aug. 11, 2020

(54) DISPLAY DEVICE HAVING TOUCH DETECTION FUNCTION AND METHOD

(71) Applicant: Japan Display Inc., Tokyo (JP)

(72) Inventors: Jin Ota, Tokyo (JP); Hidetoshi Komatsu, Tokyo (JP); Tsutomu Takabayashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 118 days.

(21) Appl. No.: 15/724,623

(22) Filed: Oct. 4, 2017

(65) Prior Publication Data

US 2018/0095575 A1 Apr. 5, 2018

(30) Foreign Application Priority Data

Oct. 4, 2016 (JP) .................. 2016-196510

(51) Int. Cl.
*G06F 3/041* (2006.01)
*G09G 3/36* (2006.01)
*G06F 3/044* (2006.01)

(52) U.S. Cl.
CPC ............ *G06F 3/0412* (2013.01); *G06F 3/044* (2013.01); *G06F 3/0416* (2013.01); *G09G 3/3614* (2013.01); *G09G 3/3648* (2013.01); *G06F 2203/04112* (2013.01); *G09G 2310/08* (2013.01); *G09G 2354/00* (2013.01)

(58) Field of Classification Search
CPC ...... G06F 3/0412; G06F 3/0416; G06F 3/044; G06F 2203/04112; G09G 3/3614; G09G 3/3648; G09G 2310/08; G09G 2354/00
See application file for complete search history.

(56) References Cited

U.S. PATENT DOCUMENTS

| 2014/0307168 A1* | 10/2014 | Law ................ H04N 5/04 348/500 |
| 2015/0277657 A1 | 10/2015 | Azumi et al. |
| 2015/0302830 A1* | 10/2015 | Shepelev ............ G06F 3/044 345/174 |
| 2016/0349896 A1* | 12/2016 | Lin .................... G06F 3/0416 |

FOREIGN PATENT DOCUMENTS

JP          2015201175 A1    11/2015

* cited by examiner

*Primary Examiner* — Sahlu Okebato

(74) *Attorney, Agent, or Firm* — Michael Best & Friedrich LLP

(57) ABSTRACT

According to one embodiment, a display device includes a display panel configured to perform display operation based on a pixel signal in a display period, a detector configured to perform touch detection operation in touch detection periods, and a driver configured to control frame operations. The driver is configured to control a first frame operation in a first frame periods including the display period, a first touch detection period and a first display adjustment period, and control a second frame operation in a second frame periods including the display period, a first touch detection period and a second display adjustment period. The second display adjustment period is longer than the first display adjustment period and includes the second touch detection period.

17 Claims, 18 Drawing Sheets

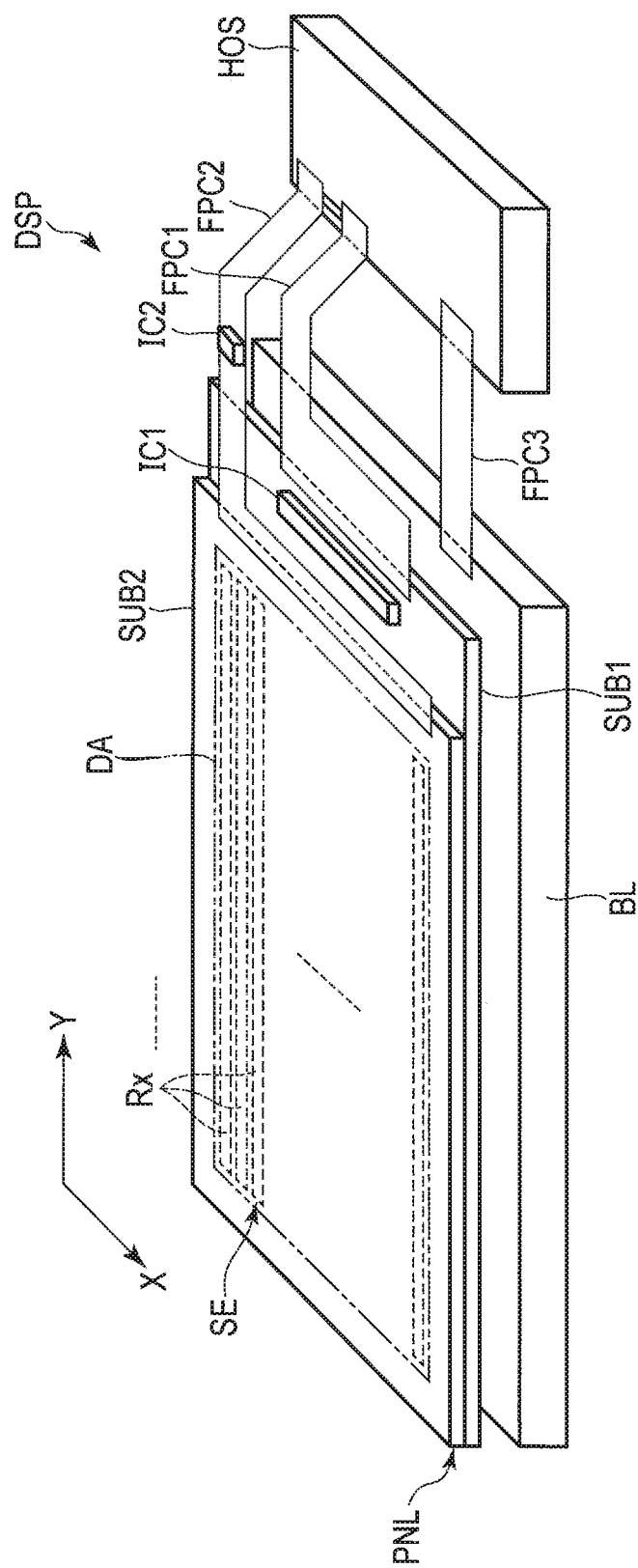
F I G. 1

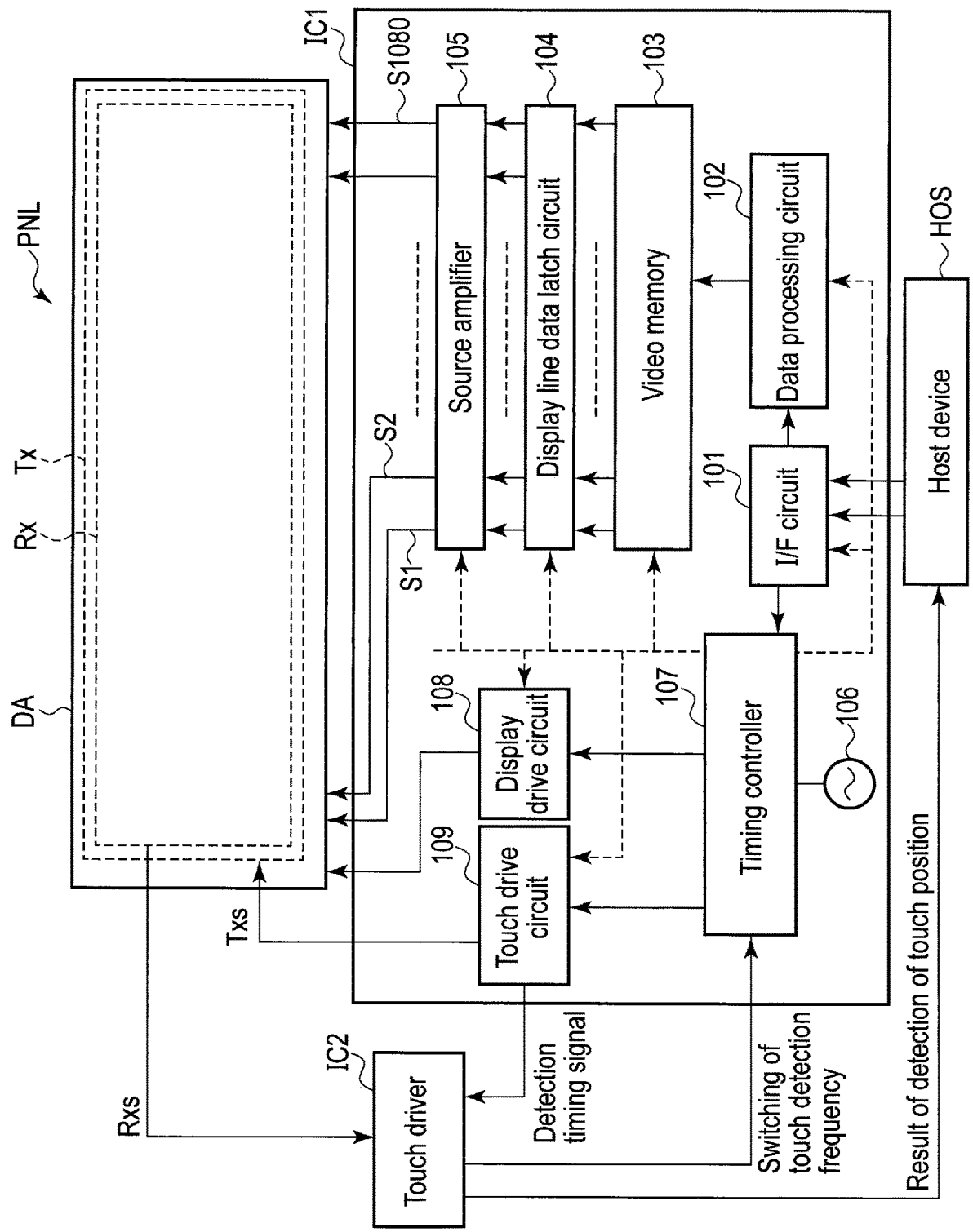
F I G. 7

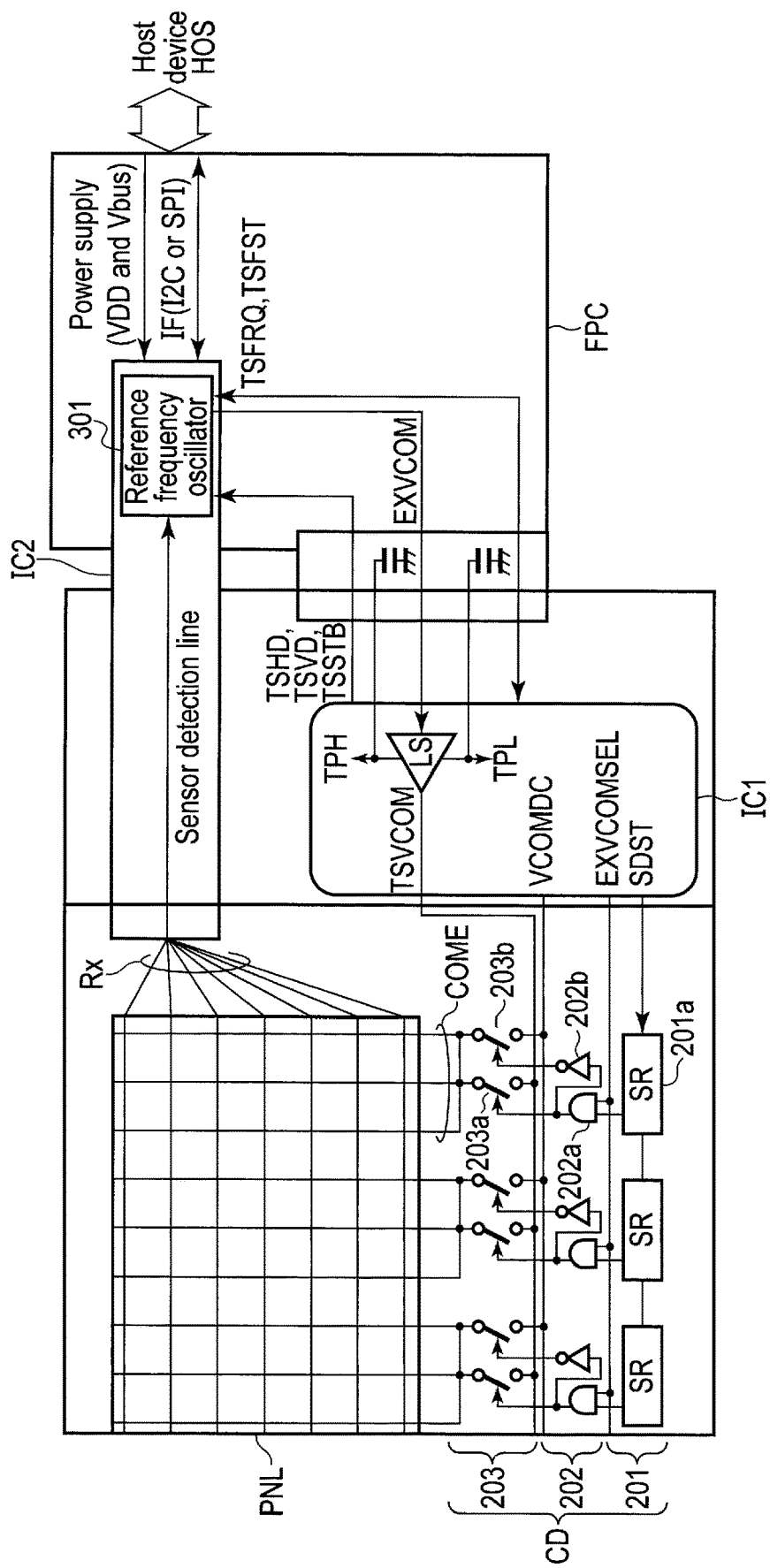
F I G. 8

|  | BP | Unit 0 | Unit 1 | ... | Unit 28 | Unit 29 | Unit 30 | Unit 31 | ... | Unit 40 | Unit 41 | Unit 42 | FP | BP | Unit 0 |
|---|---|---|---|---|---|---|---|---|---|---|---|---|---|---|---|
| LOOP_CNT | – | 0 | 1 | ... | 28 | 29 | 0 | 1 | ... | 10 | 11 | 11 | – | – | 12 |
| Start line | 1 | 5 | 50 | ... | 1265 | 1310 | 1355 | 1400 | ... | 1805 | 1850 | 1895 | 1925 | 1 | 5 |
| End line | 4 | 49 | 94 | ... | 1309 | 1354 | 1399 | 1444 | ... | 1849 | 1894 | 1924 | 1926 | 4 | 49 |
| Number of lines | 4 | 45 | 45 | ... | 45 | 45 | 45 | 45 | ... | 45 | 45 | 30 | 2 | 4 | 45 |

F I G. 10

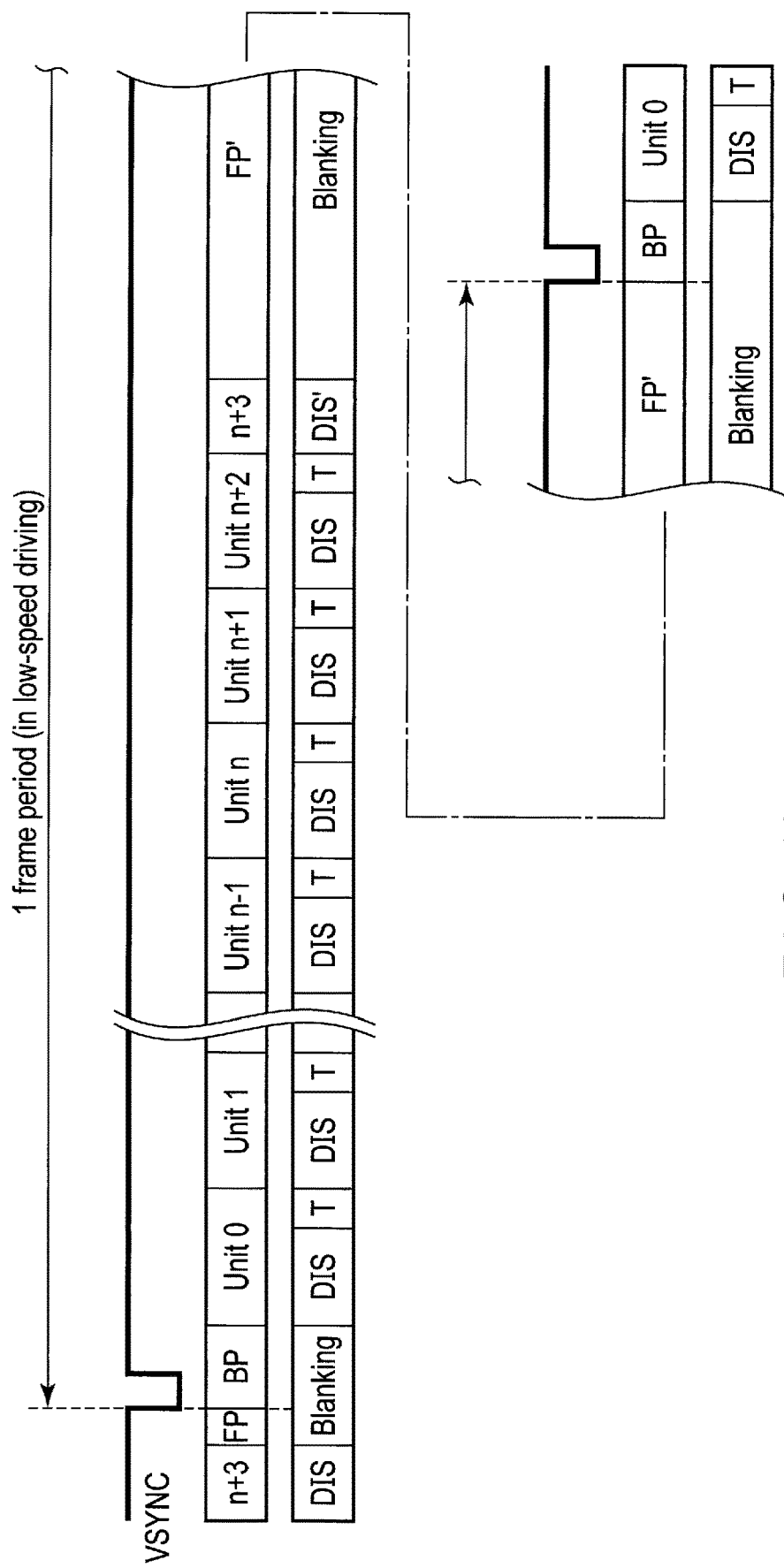
F I G. 11

DISPLAY DEVICE HAVING TOUCH DETECTION FUNCTION AND METHOD

CROSS-REFERENCE TO RELATED APPLICATIONS

This application is based upon and claims the benefit of priority from Japanese Patent Application No. 2016-196510, filed Oct. 4, 2016, the entire contents of which are incorporated herein by reference.

FIELD

Embodiments described herein relate generally to a display device having a touch detection function and a method.

BACKGROUND

In recent years, electronic devices such as smartphones and tablet computers have become widespread. In the electronic devices, display devices having a touch detection function have been employed.

In a display device having a touch detection function in which a capacitive system is employed, for example, drive electrodes and detection electrodes formed in a stripe fashion are provided so as to intersect each other. When a finger is in contact with the screen of the display device having a touch detection function, the capacitance (value) changes in the portion in which the drive electrode intersects the detection electrode. In a capacitive system, contact with a finger on the screen can be detected by using the change in capacitance.

With respect to display devices having a touch detection function in which a capacitive system is employed, a technology for reducing the thickness of each device and improving the image quality by using electrodes (common electrodes) for image display in the pixels arrayed in a two-dimensional manner as the above drive electrodes is suggested.

In this technology, a display period in which display operation for image display is performed and a touch detection period in which touch detection operation for touch detection is performed are alternately provided in each period (frame period) for displaying the image of a single frame. Before and after each frame period, display adjustment periods called a perpendicular back porch period and a perpendicular front porch period are provided.

When the refresh rate (frame rate) of an image (video) in the normal driving of a display device having a touch detection function is, for example, 60 Hz, the display device may be driven at low speed with, for example, a refresh rate of 30 Hz, to reduce power consumption.

In this case, each frame period is longer than that in normal driving. However, low-speed driving may be realized by, for example, extending each display adjustment period without changing the above display period or touch detection period.

Since touch detection operation is not performed in each display adjustment period, the sensitivity for touch detection (report rate) is decreased when each display adjustment period is extended.

BRIEF DESCRIPTION OF THE DRAWINGS

FIG. 1 is a perspective view showing an example of the outline structure of a display device having a touch detection function according to one embodiment.

FIG. 7 mainly shows an example of the circuit structure inside a panel driver.

FIG. 8 is shown for explaining a drive signal supplied to the common electrodes COME.

FIG. 10 is shown for specifically explaining display operation and touch detection operation in normal driving.

FIG. 11 is shown for explaining a comparison example for the present embodiment.

DETAILED DESCRIPTION

Figure 2:
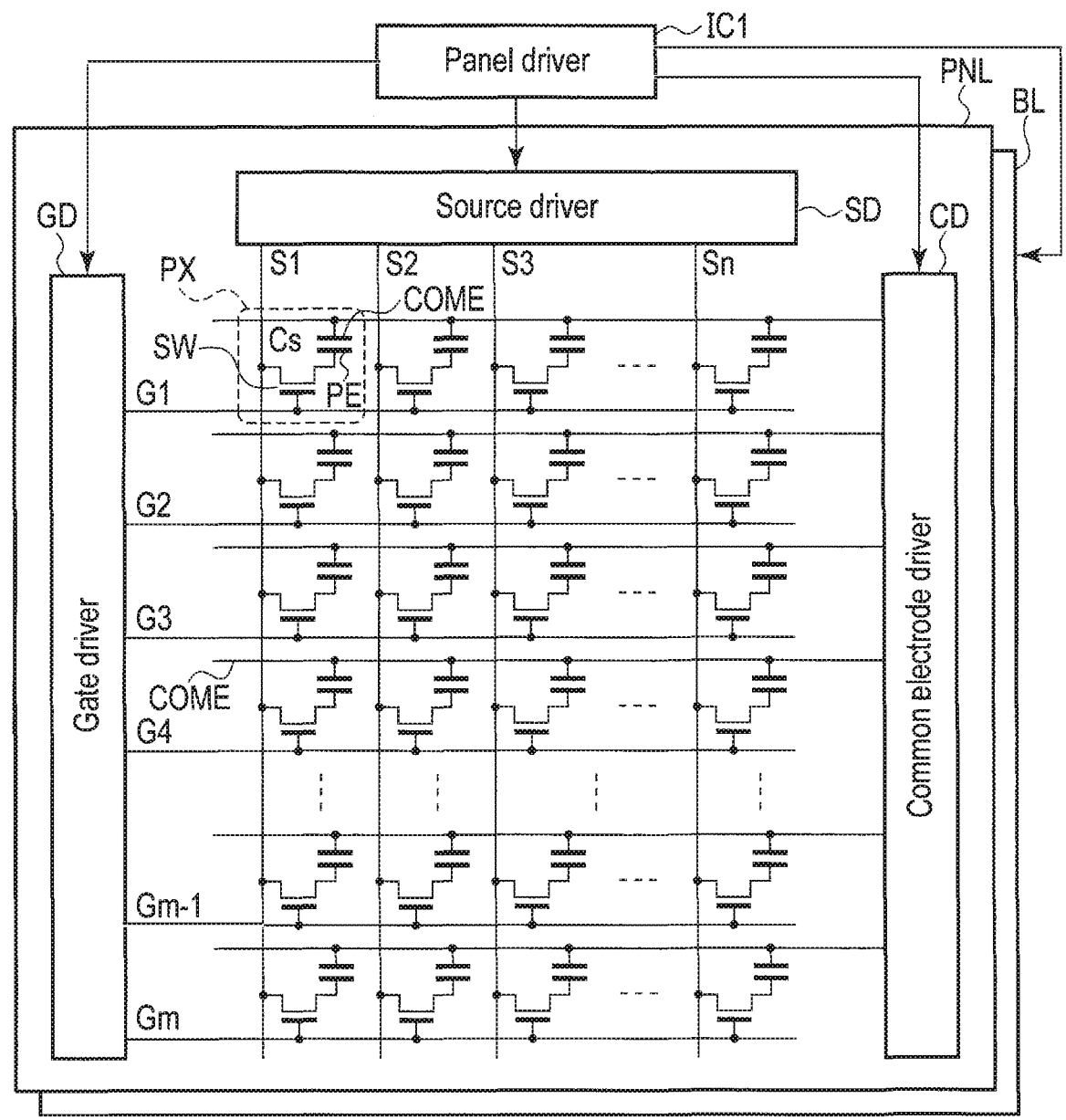
FIG. 2 mainly shows an example of the outline structure of a display panel provided in the display device.

Embodiments will be described hereinafter with reference to the accompanying drawings.

In general, according to one embodiment, a display device including a touch detection function includes a display panel configured to perform display operation based on a pixel signal in a display period, a detector configured to perform touch detection operation in touch detection periods including a first touch detection period and a second touch detection period, and a driver configured to control frame operations including a first frame operation and a second frame operation, each of the frame operations being an operation for displaying an image of a single frame. The driver is configured to control the first frame operation in a first frame periods including the display period, the first touch detection period and a first display adjustment period, and control the second frame operation in a second frame periods including the display period, the first touch detection period and a second display adjustment period. The second display adjustment period is longer than the first display adjustment period. The second display adjustment period includes the second touch detection period.

FIG. 1 is a perspective view showing the outline structure of a display device DSP having a touch detection function according to the present embodiment. The display device having a touch detection function may be a display device having an on-cell touch detection mechanism or a display device having an in-cell touch detection mechanism. In an on-cell touch detection mechanism, a touchpanel is formed on the display surface of the display device. In an in-cell touch detection mechanism, a common electrode originally provided in the display device for image display is used as one of a pair of touch detection electrodes, and the other touch detection electrode is provided so as to intersect the common electrode. In the following description, the display device DSP having a touch detection function (hereinafter, simply referred to as the display device DSP) in the present embodiment is explained as a display device having an in-cell touch detection mechanism.

As shown in FIG. 1, the display device DSP includes a display panel PNL. The display panel PNL is a display panel integrally including a touch detection mechanism. For the display panel PNL, for example, a display panel using a liquid crystal layer as a display function layer or an organic electroluminescent (EL) panel using an organic light-emitting layer is used. Here, a display panel using a liquid crystal layer is explained.

In the present embodiment, touch detection includes detection of contact of an object such as a finger (or a stylus) on the display panel PNL and, for example, detection of adjacency of an object to the display panel PNL.

The display panel PNL includes a first substrate SUB1 (array substrate), a second substrate SUB2 (counter-substrate) facing the first substrate SUB1, and a liquid crystal layer (not shown) formed between the first substrate SUB1 and the second substrate SUB2. For example, on the first substrate SUB1, a panel driver (liquid crystal driver) IC1 which drives the display panel PNL is mounted.

The display panel PNL is integrated with, for example, a touch detection mechanism SE (detector) of a capacitive change detection type. In FIG. 1, touch detection electrodes Rx forming the touch detection mechanism SE are provided on the surface of the display area DA of the display panel PNL. Each touch detection electrode Rx is, for example, a transparent electrode, and is formed of indium tin oxide (ITO), etc. The touch detection electrodes Rx may be provided either outside or inside the display panel PNL. The touch detection mechanism SE is controlled by a touch driver IC2.

A host device HOS is provided outside the display device DSP. The host device HOS is connected to the display panel PNL via a flexible wiring board FPC1 and the panel driver IC1. The host device HOS is connected to the touch detection mechanism SE via a flexible wiring board FPC2 and the touch driver IC2.

The panel driver IC1 and the touch driver IC2 may be structured as the same chip. When the touch driver IC2 and the panel driver IC1 are structured as the same chip, one of flexible wiring boards FPC1 and FPC2 may be omitted by providing the chip on, for example, the second substrate SUB2, flexible wiring board FPC1 or flexible wiring board FPC2.

A backlight unit BL is provided on the lower side of the first substrate SUB1 (in other words, the rear side of the display panel PNL) as a lighting device which illuminates the display panel PNL. A flexible wiring board FPC3 connects the backlight unit BL and the host device HOS. Various forms may be applied to the backlight unit BL. As the light source, for example, a light-emitting diode (LED) or a cold-cathode fluorescent lamp (CCFL) is considered. In this explanation, the backlight unit BL provided on the rear side of the display panel PNL is used. However, a front light provided on the display side of the display panel PNL may be used. A lighting device using a lightguide plate and an LED or CCFL provided on a side of the lightguide plate may be used. Alternatively, a lighting device using a dot-like light source in which light-emitting elements are planarly arranged may be used. When the display device DSP is a reflective type display device, or when the display panel PNL uses an organic electroluminescent display, a lighting device may not be provided.

Although omitted in FIG. 1, the display device DSP includes a secondary battery, a power supply circuit, etc.

The display panel PNL of the present embodiment may be a transmissive type, reflective type or transflective type display panel PNL. When a transmissive type display panel PNL is applied to the display device DSP, the display device DSP includes, as described above, the backlight unit BL on the rear side of the first substrate SUB1, and has a transmissive display function which displays an image by selectively transmitting the light emitted from the backlight unit BL. When a reflective type display panel PNL is applied to the display device DSP, the display device DSP includes a reflective layer which reflects light toward the rear side of the display panel PNL in comparison with the liquid crystal layer, and has a reflective display function which displays an image by selectively reflecting the light emitted from the front side (display side) of the second substrate SUB2. An auxiliary light source may be provided on the front side of the reflective type display panel PNL. The reflective layer may be formed of a material having a reflective function, such as metal, and be configured to form an electrode provided on the rear side of the display panel PNL in comparison with the liquid crystal layer. When a transflective type display panel PNL is applied to the display device DSP, the display device DSP has the above transmissive display function and the above reflective display function.

FIG. 2 mainly shows the outline structure of the display panel PNL provided in the display device DSP. As shown in FIG. 2, a plurality of display pixels PX (display elements) are arranged in matrix on the display panel PNL. Further, the display panel PNL includes scanning lines G (G1, G2, ..., Gm) extending along the rows of the display pixels PX, signal lines S (S1, S2, ..., Sn) extending along the columns of the display pixels PX, and pixel switches SW provided near the intersections of the scanning lines G and the signal lines S.

Each pixel switch SW includes a thin-film transistor (TFT). The gate electrode of each pixel switch SW is electrically connected to a corresponding scanning line G. The source electrode of each pixel switch SW is electrically connected to a corresponding signal line S. The drain electrode of each pixel switch SW is electrically connected to a corresponding pixel electrode PE. Alternatively, the source electrode of each pixel switch SW may be connected to a corresponding pixel electrode PE, and the drain electrode of each pixel switch SW may be connected to a corresponding signal line S.

A gate driver GD and a source driver SD are provided on the display panel PNL to drive the display pixels PX. The scanning lines G are electrically connected to the output terminals of the gate driver GD. The signal lines S are electrically connected to the output terminals of the source driver SD.

The gate driver GD sequentially applies on-voltage to a plurality of scanning lines G and applies on-voltage to the gate electrodes of the pixel switches SW electrically connected to the selected scanning lines G. The pixel switches SW including the gate electrodes to which on-voltage is applied are brought into conduction between the source electrodes and the drain electrodes.

The source driver SD supplies a corresponding output signal to each signal line S. The signal supplied to each signal line S is applied to corresponding pixel electrodes PE via the pixel switches SW brought into conduction between the source electrodes and the drain electrodes.

Further, the display panel PNL includes a common electrode driver CD. The common electrode driver CD is a circuit which supplies a drive signal (in other words, a circuit which applies drive voltage) to the common electrodes COME of the display device DSP. The common electrodes COME are explained later. The pixel electrodes PE and the common electrodes COME face each other via an insulating film. The pixel electrodes PE, the common electrodes COME and the insulating film form storage capacitance CS.

The gate driver GD, the source driver SD and the common electrode driver CD are provided in the peripheral region (frame) of the display panel PNL, and are controlled by the panel driver IC1. Further, the panel driver IC1 controls the operation of the backlight unit BL.

FIG. 2 shows only one gate driver GD. However, the display panel PNL may include a plurality of (for example, two) gate drivers GD. When two gate drivers are provided, for example, one of the gate drivers is connected to, of the plurality of scanning lines G, scanning lines G1, G3, ..., Gm−1. The other gate driver is connected to scanning lines G2, G4, ..., Gm. For example, the two gate drivers are provided so as to face each other across intervening display pixels PX.

Figure 3:
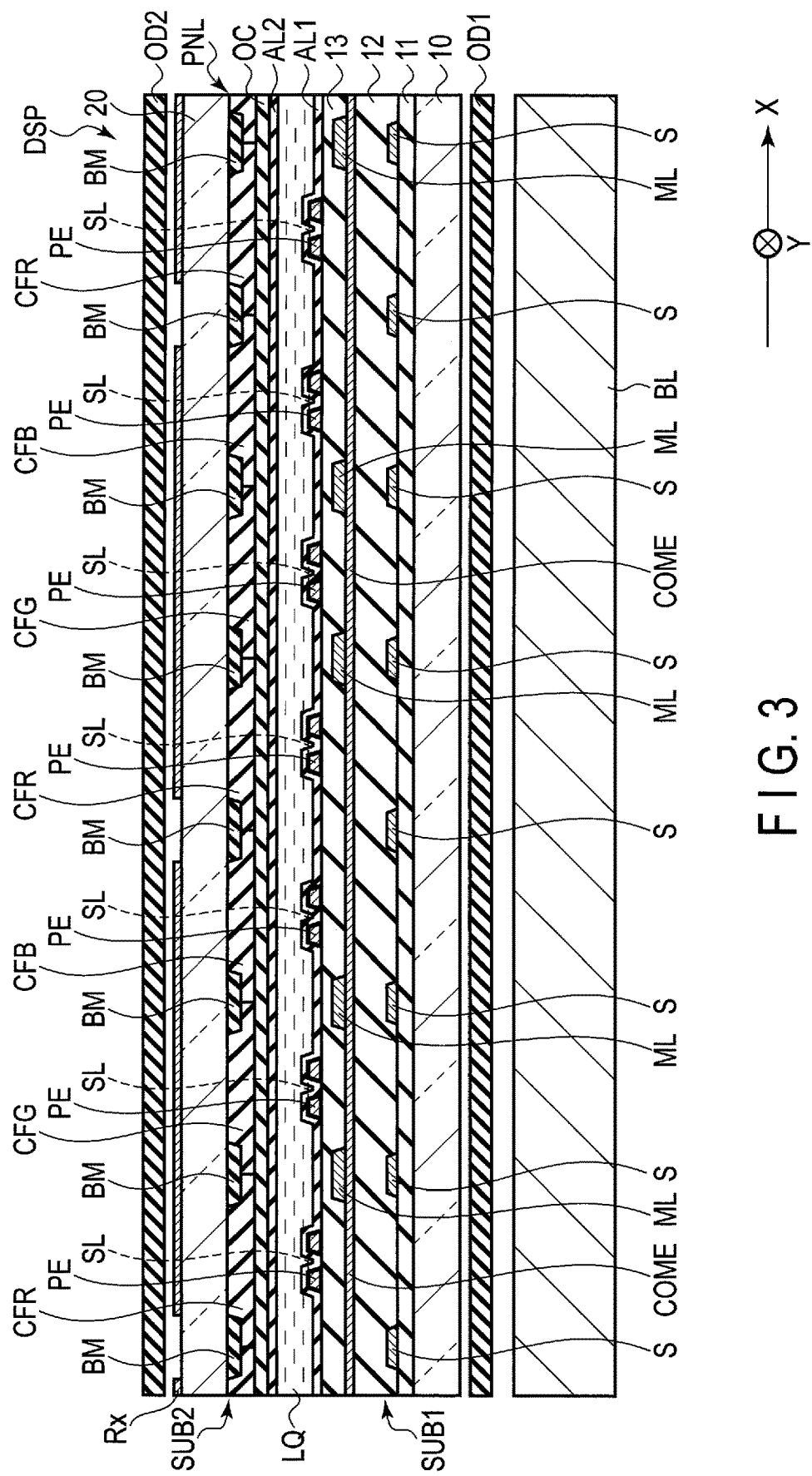
FIG. 3 schematically shows an example of the cross-sectional structure of the display device.

FIG. 3 is a drawing (cross-sectional view) schematically showing the cross-sectional structure of the display device DSP. The display device DSP includes the display panel PNL, the backlight unit BL, a first optical element OD1 and a second optical element OD2.

In FIG. 3, the display panel PNL includes a structure corresponding to a fringe-field switching (FFS) mode as a display mode. However, the display panel PNL may include a structure corresponding to another display mode.

As described above, the display panel PNL includes the first substrate SUB1, the second substrate SUB2 and the liquid crystal layer LQ. The first substrate SUB1 is attached to the second substrate SUB2 in a state where a predetermined cell gap is formed. The liquid crystal layer LQ is retained in the cell gap between the first substrate SUB1 and the second substrate SUB2.

The first substrate SUB1 is formed by using a phototransmissive first insulating substrate 10 such as a glass or resinous substrate. The first substrate SUB1 includes, on the side of the first insulating substrate 10 facing the second substrate SUB2, the signal lines S, the common electrodes COME, the pixel electrodes PE, a first insulating film 11, a second insulating film 12, a third insulating film 13, a first alignment film AL1, etc.

The pixel electrodes PE and the common electrodes COME constitute the display pixels PX together with the pixel region of the liquid crystal layer LQ. The display pixels PX are arranged in matrix on the display panel PNL as explained with reference to FIG. 2.

The first insulating film 11 is provided on the first insulating substrate 10. The signal lines S are formed on the first insulating film 11. In the example shown in FIG. 3, the signal lines S extend in a Y-direction.

Although not shown in FIG. 3, for example, the scanning lines G and the gate electrodes and semiconductor layer of the switching elements (pixel switches SW) are provided between the first insulating substrate 10 and the first insulating film 11. Further, the source and drain electrodes of the switching elements are formed on the first insulating film 11.

The second insulating film 12 is provided on the signal lines S and the first insulating film 11. The common electrodes COME are formed on the second insulating film 12. The common electrodes COME are formed as a plurality of segments. These segments extend in an X-direction and are arranged in the Y-direction at predetermined intervals. The common electrodes COME are formed of a transparent conductive material such as indium tin oxide (ITO) or indium zinc oxide (IZO). In the example shown in FIG. 3, metal layers ML are formed on the common electrodes COME. The resistance of the common electrodes COME is made low. The metal layers ML may be omitted.

The third insulating film 13 is provided on the common electrodes COME and the second insulating film 12. The pixel electrodes PE are formed on the third insulating film 13. Each pixel electrode PE is located between adjacent signal lines S and faces the common electrodes COME. Each pixel electrode PE includes a slit SL at a position facing the common electrodes COME. These pixel electrodes PE are formed of, for example, a transparent conductive material such as ITO or IZO. The first alignment film AL1 covers the pixel electrodes PE and the third insulating film 13.

The second substrate SUB2 is formed by using a phototransmissive second insulating substrate 20 such as a glass or resinous substrate. The second substrate SUB2 includes, on the side of the second insulating substrate 20 facing the first substrate SUB1, a black matrix BM, color filters CFR, CFG and CFB, an overcoat layer OC, a second alignment film AL2, etc.

The black matrix BM is formed on the inner surface of the second insulating substrate 20, and defines the pixels. Color filters CFR, CFG and CFB are formed on the inner surface of the second insulating substrate 20 and partially overlap the black matrix BM. Color filters CFR are red color filters. Color filters CFG are green color filters. Color filters CFB are blue color filters. The overcoat layer OC covers color filters CFR, CFG and CFB. The overcoat layer OC is formed of a transparent resinous material. The second alignment film AL2 covers the overcoat layer OC.

For example, the color filters and black matrix may be formed on the first insulating substrate 10. The color filters may be stacked on, for example, the pixel electrodes PE.

The touch detection electrodes Rx are formed on the outer surface of the second insulating substrate 20. The touch detection electrodes Rx are formed in an island shape. Here, lead lines are omitted for the sake of convenience. The touch detection electrodes Rx are formed of a metal material such as aluminum (Al), titanium (Ti), silver (Ag), molybdenum (Mo), tungsten (W), copper (Cu) or chromium (Cr), alloy prepared by combining these metal materials, a transparent conductive material such as ITO or IZO, a conductive organic material, or a dispersion element of fine conductive substances. The touch detection electrodes Rx may have either a single-layer structure or multilayer structure formed of the above materials. As an example of the multilayer structure, each touch detection electrode Rx includes a metal thin line formed of the above metal materials, and a transparent conductive material. When a metal material is used for each touch detection electrode Rx, mesh processing may be applied. In this case, a process for making each touch detection electrode Rx invisible may be applied, such as plate processing with a black material.

The backlight unit BL is provided on the rear side of the display panel PNL as described above. The first optical element OD1 is provided between the first insulating substrate 10 and the backlight unit BL. The second optical element OD2 is provided on the touch detection electrodes Rx. Each of the first and second optical elements OD1 and OD2 includes at least a polarizer. Each of the first and second optical elements OD1 and OD2 may include a retardation film depending on the need.

Figure 4:
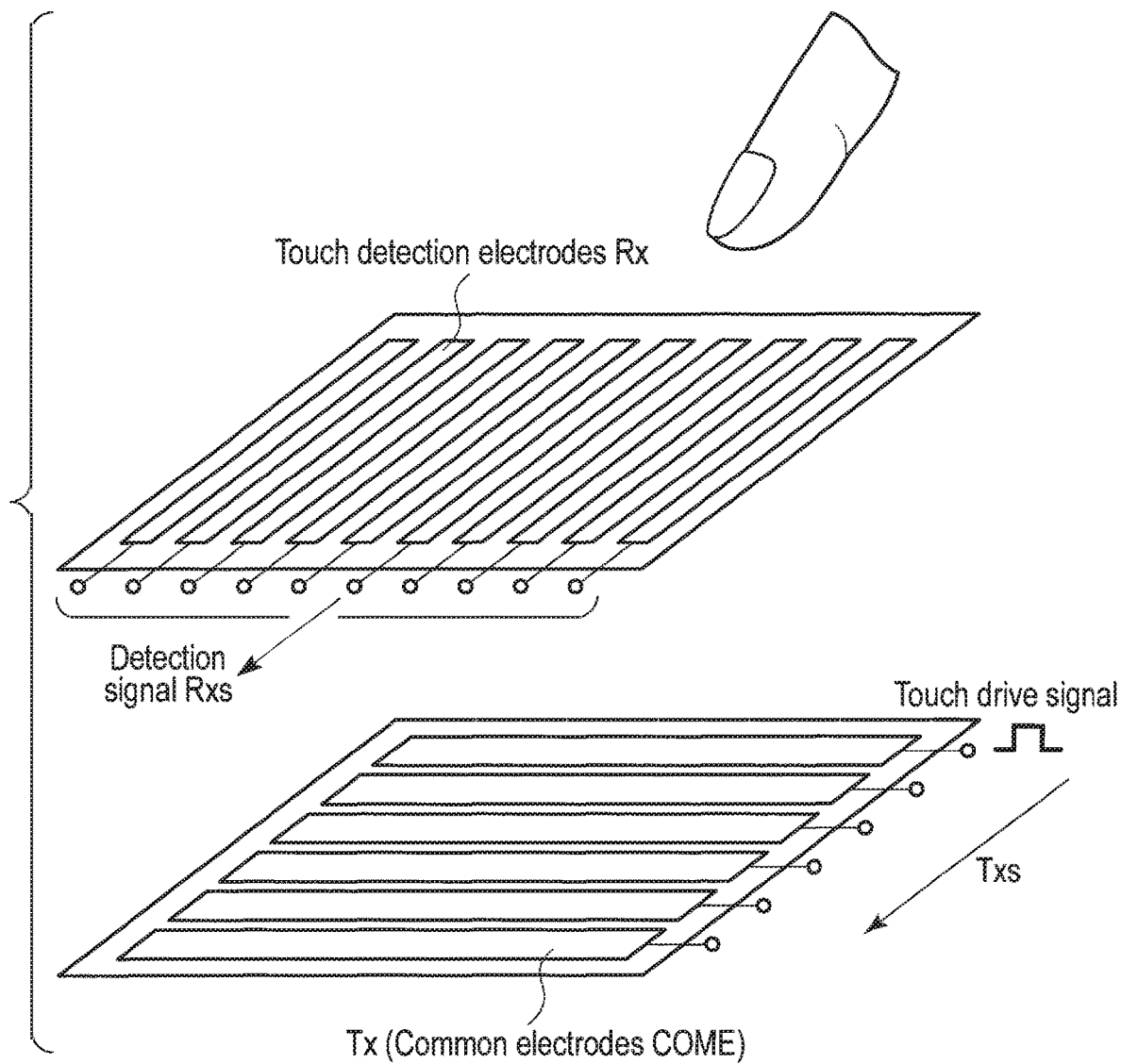
FIG. 4 is shown for explaining the basic operation of a touch detection mechanism.

FIG. 4 is shown for explaining the basic operation of the touch detection mechanism SE. FIG. 4 shows the touch detection mechanism SE in a mutual (mutual capacitive) detection system. The touch detection system of the touch detection mechanism SE may be another detection system such as a self-detection system.

In the touch detection mechanism SE in a mutual detection system, for example, the touch detection electrodes (detection elements) Rx are formed in a stripe fashion in the Y-direction on the second substrate SUB2, and further, drive electrodes Tx are formed in a stripe fashion in the X-direction on the first substrate SUB1. The touch detection electrodes Rx intersect the drive electrodes Tx. For the drive electrodes Tx, the above common electrodes COME for image display are used.

The touch detection electrodes Rx may be formed in a stripe fashion in the X-direction, and the drive electrodes Tx may be formed in a stripe fashion in the Y-direction.

In this structure, the common electrodes COME used as the drive electrodes Tx are sequentially driven by the drive signals (touch drive signals) Txs of a high-frequency pulse in the touch detection periods described later. In this case, for example, a touch detection signal Rxs at low level is detected from a touch detection electrode Rx close to a detection object (external close object) in comparison with the output from the other touch detection electrodes Rx. In addition to the first capacitance generated between the touch detection electrode Rx close to the detection object and the common electrode COME, second capacitance is generated between the touch detection electrode Rx and the detection object. Thus, the touch detection electrode Rx is capable of outputting a touch detection signal Rxs based on the change in the capacitance based on the external close object.

In the touch detection mechanism SE, it is possible to determine the coordinate position of the detection object based on the drive timing of the common electrode COME as the drive electrode Tx and the position of the touch detection electrode Rx which has output a detection signal Rxs at low level.

Figure 5:
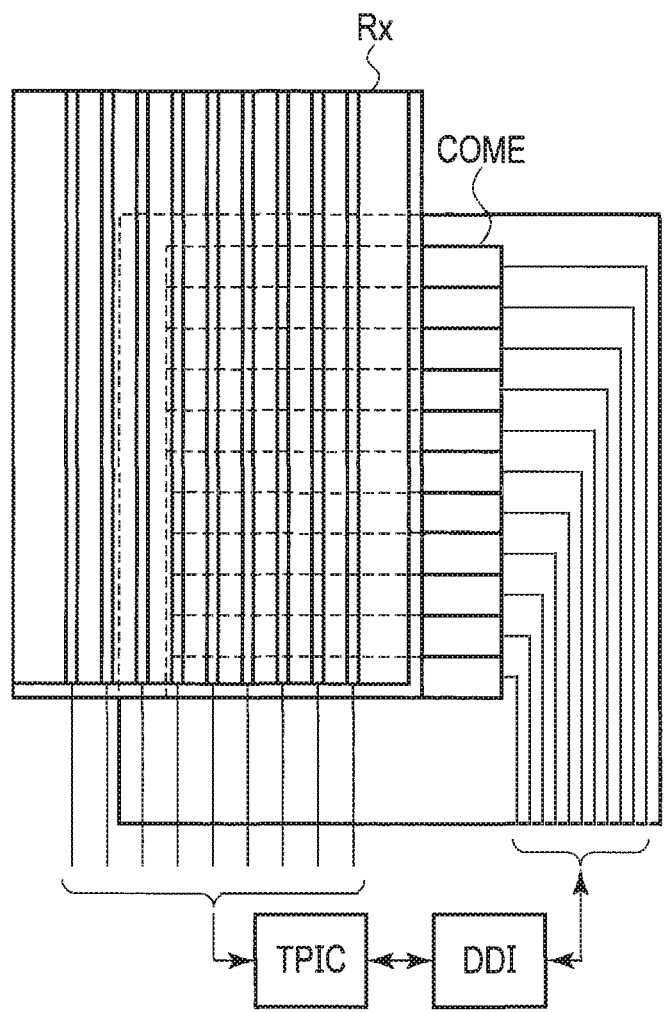
FIG. 5 is shown for explaining a structural example of common electrodes and touch detection electrodes.

FIG. 5 is shown for explaining a structural example of the common electrodes COME (drive electrodes Tx) and the touch detection electrodes Rx.

In the display device DSP of the present embodiment, a drive pulse TSVCOM (touch drive signal Txs) is input to the common electrodes COME by the cooperation between the panel driver IC1 (DDI) and the touch driver IC2 (TPIC), and a detection pulse (touch detection signal Rxs) is obtained from the touch detection electrodes Rx. The touch driver IC2 recognizes the contact position of the detection object based on the positions of the common electrodes COME to which a drive pulse TSVCOM is input and the waveform of the detection pulse. The calculation of the contact position (touch position) may be performed by an external device (for example, the host device HOS; not shown). The details of reception signals between the panel driver IC1 and the touch driver IC2 are explained later.

Figure 6:
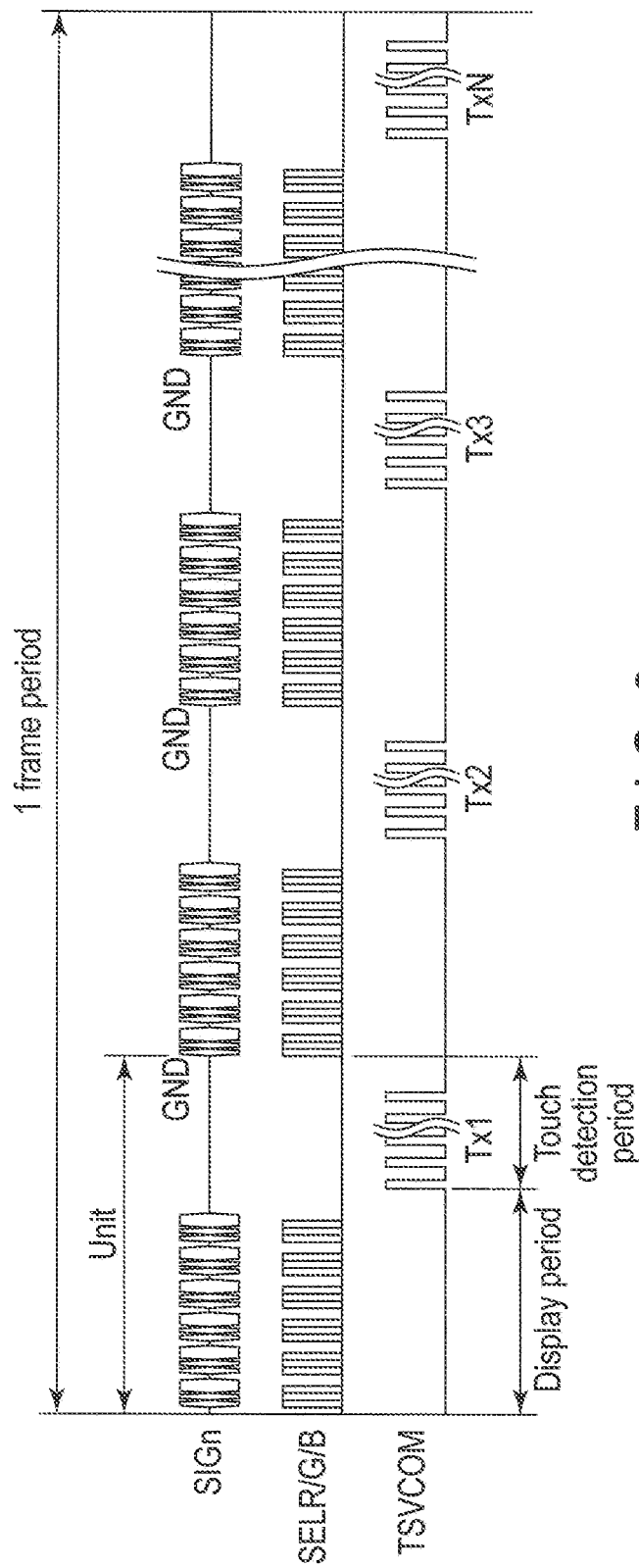
FIG. 6 is shown for explaining the relationship between display periods and touch detection periods.

Now, this specification explains the relationship between display periods and touch detection periods with reference to FIG. 6.

In the present embodiment, each display period includes a period in which display operation is performed. The display operation is an operation for displaying an image on the display panel PNL. In other words, the display operation is an operation for driving the display pixels PX by the gate driver GD and the source driver SD. Each touch detection period includes a period in which touch detection operation is performed. The touch detection operation is an operation for supplying a touch drive signal Txs to the above common electrodes COME (drive electrodes Tx) and detecting a touch detection signal Rxs.

As the drive electrodes Tx to which a touch drive signal Txs is supplied in each touch detection period, as described above, a plurality of stripe common electrodes COME are used. Since the common electrodes COME used for image display are also used as the drive electrodes Tx for touch detection, in the present embodiment, display operation and touch detection operation are performed in a time-sharing system.

Specifically, as shown in FIG. 6, each period in which the image of a single frame is displayed by the above display operation (hereinafter, referred to as each frame period) includes a plurality of units. Each unit is divided into a display period and a touch detection period. In the period of each unit, operation (display operation) for supplying a pixel signal to the display pixels PX is performed in the display period, and subsequently, operation (touch detection operation) for supplying a touch drive signal Txs to the common electrodes COME as the drive electrodes Tx is performed in the touch detection period. Specially, the display operation is an operation for outputting the pixel signal (SIGn) of a color corresponding to a signal (SELR/G/B) selecting one of three colors RGB is performed for a plurality of display rows (lines) in the display period. As stated above, each frame period includes a plurality of units. Thus, a display period and a touch detection period are alternately repeated in each frame period.

The control related to display operation and touch detection operation is performed by the panel driver IC1 in the present embodiment.

FIG. 7 mainly shows an example of the circuit structure inside the panel driver IC1. As shown in FIG. 7, the panel driver IC1 includes an interface (I/F) circuit 101, a data processing circuit 102, a video memory 103, a display line data latch circuit 104, a source amplifier 105, an internal oscillator 106, a timing controller 107, a display drive circuit 108 and a touch drive circuit 109.

As described above, the panel driver IC1 is connected to the host device HOS. The host device HOS outputs pixel data, a synchronous signal, etc. The pixel data and synchronous signal output from the host device HOS are received by the interface circuit 101.

The pixel data received by the interface circuit 101 is input to the data processing circuit 102. The data processing circuit 102 applies an interpolating process, a synthesis process, etc., to the input pixel data to conform the data to the display by the display panel PNL.

The pixel data subjected to an interpolating process and a synthesis process by the data processing circuit 102 (the pixel data output from the data processing circuit 102) is written to the video memory 103. For example, the whole image of a single frame (specifically, the pixel data of the whole image of a single frame) can be stored in the video memory 103. For the video memory 103, for example, an SRAM or a DRAM may be used.

The display line data latch circuit 104 latches the pixel data written to the video memory 103. The source amplifier 105 applies analog conversion to the pixel data latched by the display line data latch circuit 104 such that the pixel data is converted into a pixel signal. Gamma correction is applied to the pixel signal. Subsequently, the pixel signal is supplied to the display panel PNL. The pixel signal is written to each display pixel PX in which the gate is open (in other words, each pixel PX in which on-voltage is applied to the gate electrode of the pixel switch SW) via signal lines S (for example, S1 to S1080). In this way, operation for displaying an image is performed on the display panel PNL.

For example, the timing controller 107 operates all the circuit blocks inside the panel driver IC1 in synchronization with each other based on a command received from the host device HOS. The timing controller 107 receives a basic clock from the internal oscillator 106. The timing controller 107 generates various timing signals based on the basic clock. The timing controller 107 is capable of controlling the increase or decrease in the oscillating frequency of the internal oscillator 106.

The timing controller 107 includes a phase control circuit, controls the relationship between the clock (internal clock) phase of the internal oscillator 106 and the phase of the synchronous signal of an external device (host device HOS) so as to be a predetermined relationship, and maintains the controlled relationship. The timing controller 107 generates timing signals (a perpendicular synchronous signal and a horizontal synchronous signal) for writing pixel signals based on the internal clock. In this case, the timing controller 107 generates an internal perpendicular synchronous pulse and horizontal synchronous pulse.

The timing signals generated by the timing controller 107 are supplied to, for example, the display drive circuit 108 and the touch drive circuit 109. The timing controller 107 generates various timing pulses and supplies them to the interface circuit 101, the data processing circuit 102, the video memory 103, the display line data latch circuit 104 and the source amplifier 105.

In this manner, the timing controller 107 is capable of integrally controlling the blocks inside the panel driver IC1 as described above.

The display drive circuit 108 is capable of controlling the source driver (source selection circuit) SD and the gate driver GD and specifying the line to which a pixel signal should be written (specifically, display pixels PX corresponding to the line) based on the timing signals from the timing controller 107.

The touch drive circuit 109 outputs a perpendicular synchronous signal and a horizontal synchronous signal to the touch driver IC2 as timing signals related to touch detection operation. The touch drive circuit 109 supplies the above drive signal Txs to the common electrodes COME in the allocated time (specifically, a touch detection period). In this way, a touch detection signal Rxs is output from the touch detection electrodes Rx.

The touch detection signal Rxs output from the touch detection electrodes Rx is input to the touch driver IC2. The touch driver IC2 detects (determines) the touch position based on the temporal relevance between the drive timing of the drive signal Txs and the detection timing of the touch detection signal Rxs. The result of detection of the touch position is output to the host device HOS. In this case, the host device HOS performs various processes (programming operation) based on the result of detection of the touch position output by the touch driver IC2.

The touch driver IC2 is capable of providing the timing controller 107 with a signal for switching the touch detection frequency. In the case of normal driving of the display device DSP of the present embodiment, the display drive frequency (refresh rate) and the touch detection frequency of the display device DSP are, for example, 60 Hz. The display drive frequency is equivalent to the perpendicular synchronous frequency, and indicates the number of frames rewritten per unit time by the display operation on the display panel PNL. The touch detection frequency is the frequency for scanning the display surface (touch operation surface), and indicates the drive frequency (the frequency of touch drive signals Txs) of the drive electrodes Tx (common electrodes COME) forming the touch detection mechanism SE.

When the sensitivity for touch detection is increased in comparison with the above normal operation, the touch driver IC2 is capable of providing the timing controller 107 with a signal for switching the touch detection frequency to 120 Hz. The conditions for switching the touch detection frequency may be set in advance in the display device DSP.

Now, this specification explains a drive signal supplied to the above common electrodes COME with reference to FIG. 8.

As described above, the common electrode driver CD is provided in the display panel PNL. The common electrode driver CD is connected to the panel driver IC1. The drive signal output from the panel driver IC1 supplies a drive pulse TSVCOM to the common electrodes COME (drive electrodes Tx) via the common electrode driver CD. The touch detection electrodes Rx are provided on the surface of the display area DA of the display panel PNL. The touch detection signal lines from the touch detection electrodes Rx are electrically connected to the touch driver IC2 via external leading electrodes.

The touch driver IC2 is connected to the host device HOS via flexible wiring board FPC2. Data is transferred in accordance with a communication system such as an inter-integrated circuit (I2C) or serial peripheral interface (SPI) between the touch driver IC2 and the host device HOS. Power (VDD and Vbus) is supplied to the touch driver IC2 from outside.

Now, this specification explains the signals transferred between the panel driver IC1 and the touch driver IC2.

The panel driver IC1 outputs signals for synchronization with the touch driver IC2 to the touch driver IC2. The signals for synchronization include a perpendicular synchronous signal TSVD and a horizontal synchronous signal TSHD. The perpendicular synchronous signal TSVD is a synchronous signal indicating the start of the frame displayed by display operation on the display panel PNL. The horizontal synchronous signal TSHD is a synchronous signal corresponding to the display operation for each line of the frame.

The touch driver IC2 outputs a drive synchronous signal EXVCOM synchronized with the sampling timing for touch detection to the panel driver IC1 based on the perpendicular synchronous signal TSVD and the horizontal synchronous signal TSHD. The panel driver IC1 outputs a drive pulse TSVCOM prepared by applying level-shifting and impedance conversion to the drive synchronous signal EXVCOM to the common electrode driver CD.

The common electrode driver CD includes shift register circuits 201, select circuits 202 and switch circuits 203.

A touch detection (scanning) start pulse SDST and a touch detection (scanning) clock SDCK (not shown) are input to the shift register circuits 201 as control signals related to touch detection operation. A plurality of touch detection clocks (SDCK1 and SDCK2) may be used in accordance with the specification.

According to the touch detection start pulse SDST and the touch detection clock SDCK, the shift register circuits 201 can be sequentially selected. The selected shift register circuits 201 output 1.

When the single shift register circuit 201a shown in FIG. 8 is explained, the output terminal of the shift register circuit 201a is connected to an input terminal of an AND circuit 202a included in the select circuit 202. A drive synchronous select signal EXVCOMSEL is input to the other input terminal of the AND circuit 202a. The drive synchronous select signal EXVCOMSEL is a signal for identifying a touch detection period. Specifically, the drive synchronous select signal EXVCOMSEL is a signal for indicating 1 in touch detection periods and indicating 0 in display periods.

A touch switch 203a and a display switch 203b are included in the switch circuit 203. The touch switch 203a and the display switch 203b are in a connected state (on-state) when 1 is input. The touch switch 203a and the display switch 203b are in a disconnected state (off-state) when 0 is input.

For example, when the output of the shift register circuit 201a is 1, and further when a touch detection period is currently applied (in other words, when a drive synchronous select signal EXVCOMSEL indicates 1), the output of the AND circuit 202a is 1, and the touch switch 203a provided in the switch circuit 203 is switched to a connected state. In this case, a drive pulse TSVCOM is applied to the common electrodes COME used as the drive electrodes Tx via the touch switch 203a.

In the case of a display period, the output of the AND circuit 202a is 0. The output of the AND circuit 202a is changed to 1 by an inverter 202b included in the select circuit 202. The display switch 203b included in the switch circuit 203 is switched to a connected state. In this case, a DC signal VCOMDC is input to the common electrodes COME via the display switch 203b.

As described above, for example, when the shift register 201a is selected in a touch detection period, a drive pulse TSVCOM is input to the common electrodes COME via the touch switch 203a.

The touch driver IC2 is capable of obtaining touch detection signals Rxs from the touch detection electrodes Rx in accordance with the drive pulse TSVCOM. A reference frequency oscillator 301 is independently provided in the touch driver IC2. In this manner, the touch detection frequency (the drive frequency of touch driving) can be set to an arbitrary value independently from the display drive frequency.

In the present embodiment, the number of display lines to which pixel signals are written in the display period of each unit (hereinafter, referred to as the number of display lines in each unit), the output timing of a perpendicular synchronous signal TSVD and a horizontal synchronous signal TSHD, and the output timing of a touch detection start pulse SDST and a touch detection clock SDCK are variable. In this case, for example, a plurality of types of constant tables defining the number of display lines in each unit and the output timing of each signal (pulse) are prepared in the panel driver IC1. Of the plurality of types of constant tables, for example, the panel driver IC1 operates in accordance with the constant table specified by the touch driver IC2 (specifically, the data defined in the specified constant table).

Figure 9:
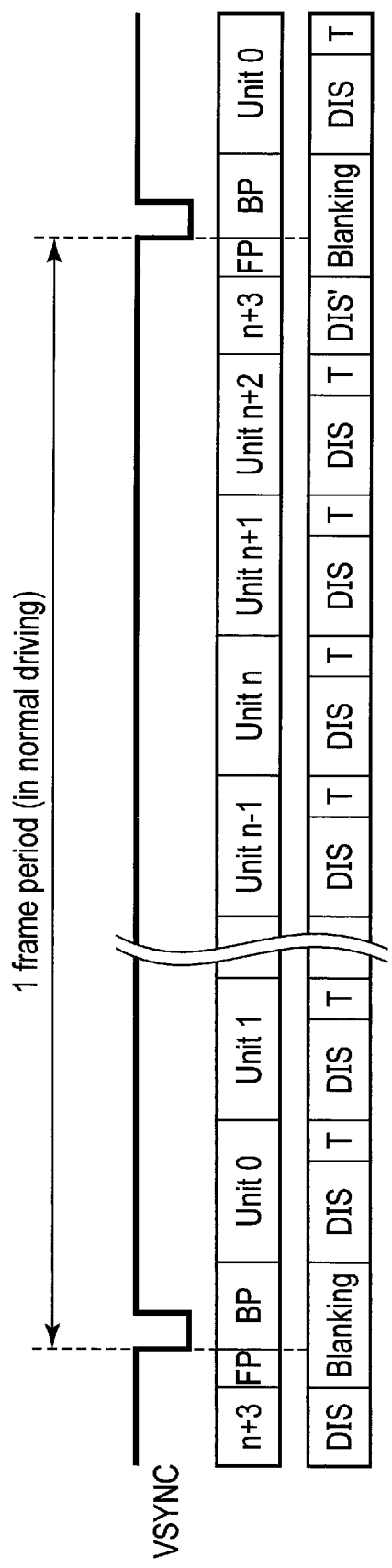
FIG. 9 is shown for explaining the arrangement of display periods and touch detection periods in normal driving.

Now, this specification explains the operation of the display device DSP of the present embodiment. Firstly, the arrangement of display periods and touch detection periods in normal driving is explained with reference to FIG. 9. In FIG. 9, the period in which display operation is performed is indicated as a display period DIS. The period in which touch detection operation is performed is indicated as a touch detection period T. This indication is also applicable to the subsequent drawings.

As shown in FIG. 9, after a perpendicular synchronous signal VSYNC for display is input to the panel driver IC1, display operation and touch detection operation are performed via a perpendicular back porch period BP. The perpendicular back porch period BP is equivalent to the period from the start of each frame period (perpendicular synchronous time) until the start of writing of data (pixel signals) to the first line of the image of a single frame. In the perpendicular back porch period BP, a predetermined number of lines are driven.

The display periods DIS and the touch detection periods T are managed based on each unit. Each unit includes a display period DIS and a touch detection period T. A plurality of units are set in each frame period. In this way, in each frame period, display operation and touch detection operation are repeatedly performed (in other words, a display period DIS and a touch detection period T are alternately provided).

In the display period DIS included in each unit, for example, the lines of the number of display lines in each unit set in the register are driven, and pixel signals are written to display pixels PX corresponding to the lines (in other words, display operation is performed). In the touch detection period T included in each unit, for example, the common electrodes COME used as the driven electrodes Tx set in advance are driven, and touch detection signals Rxs are output from the touch detection electrodes Rx (in other words, touch detection operation is performed).

The cycle of display operation for displaying the screen of a single frame is set so as to be equivalent to a single frame period. Further, the number of display lines in each unit and the number of units are set so as to display the screen of a single frame in the frame period. The cycle of touch detection operation (in other words, the cycle for supplying touch drive signals Txs to the drive electrodes Tx provided in the touch detection mechanism SE) may be synchronized with the cycle of display operation, or may not be synchronized with the cycle of display operation.

When the cycle of touch detection operation is synchronized with the cycle of display operation, control is performed such that the integral multiple of the cycle of touch detection operation, for example, one or two cycles of touch detection operation conform to the cycle of display operation (a single frame period).

When the cycle of touch detection operation is not synchronized with the cycle of display operation, there is no need to conform the cycle of display operation (a single frame period) to one or more cycles of touch detection operation.

In the following explanation, it is assumed that the cycle of touch detection operation is controlled independently from the cycle of display operation (in other words, the cycle of touch detection operation is not synchronized with the cycle of display operation).

The display operation and the touch detection operation in each frame period (repetition) end when the number of lines to which pixel signals are written by display operation has reached the maximum number of display lines. The maximum number of display lines is the number of lines to which pixel signals are written in the image of a single frame. The remaining display lines are (the remainder obtained when the maximum number of display lines is divided by the number of display lines in each unit is) allocated for the last unit (specifically, the display period included in the last unit). Thus, the number of display lines of the last unit (unit n+3 shown in FIG. 9) is less than the number of display lines in each of the previous units. When the display operation and the touch detection operation in each frame period end, the above operation in each frame period is repeated via a perpendicular front porch period FP. The perpendicular front porch period FP is equivalent to the period after the completion of writing of data (pixel signals) to the last line of the image of a single frame until the input of the next perpendicular synchronous signal VSYNC. In the perpendicular front porch period FP, a predetermined number of lines are driven.

The above perpendicular back porch period BP and perpendicular front porch period FP are called display adjustment periods. The display adjustment periods function to, for example, prepare for polarity inversion, perform calculation in an internal image process, read data or perform an expulsion processing in the gate driver (scanner).

Now, this specification specifically explains display operation and touch detection operation in normal driving with reference to FIG. 10. In the example shown in FIG. 10, it is assumed that the number of display lines in each unit (LINE_NUMBER_OF_UNIT) is set to 45. The cycle of display operation for displaying the screen of a single frame (in other words, the number of lines to which pixel signals are written in the display period DIS included in each unit of a single frame period) can be managed by the unit numbers (unit 0, unit 1, . . . ) shown in FIG. 10.

In FIG. 10, the start line and the end line indicate the position of the first line and the position of the last line driven in each perpendicular back porch period BP, the display period DIS included in each unit and each perpendicular front porch period FP. In FIG. 10, the number of lines indicates the number of lines driven in each perpendicular back porch period BP, the display period DIS included in each unit and each perpendicular front porch period FP.

In the example, four lines are driven in each perpendicular porch period BP, and two lines are driven in each perpendicular front porch period FP. The number of effective active display lines (in other words, the number of lines to which pixel signals are written by display operation) is assumed to be 1920 from unit 0 to unit 42. In this case, the number of lines in each of units 0 to 41 is 45 set as the number of display lines in each unit. However, the number of lines in unit 42 is 30 (=1920−45×42) as a remainder. In the following explanation, unit 42 is called a dummy unit. In FIG. 9, the dummy unit is unit n+3. The display period included in the dummy unit is a display period DIS'.

The number of lines (30) driven in the display period DIS' included in the dummy unit is less than the number of lines (45) driven in the display periods DIS included in the other units 0 to 41. Thus, the display period DIS' is shorter than each display period DIS. It is assumed that the dummy unit does not include a touch detection period. The maximum value of the unit number of the units other than the dummy unit is called an effective unit number (VALID_UNIT_NUM). In the example shown in FIG. 10, the effective unit number is 41. The effective unit number is set in advance.

The number of lines driven in each perpendicular back porch period BP and each perpendicular front porch period FP is determined in advance by, for example, the specification of the display panel PNL.

Since each touch detection period T is provided after a corresponding display period DIS, the arrangement (timing) of touch detection periods T can be managed by the unit numbers. When the cycle of touch detection operation is independent from the cycle of display operation, the cycle of touch detection operation cannot be managed by the unit numbers.

Thus, the cycle of touch detection operation is managed by using a loop counter (LOOP_CNT) configured to be incremented based on each unit (each touch detection period T).

The number of units corresponding to the cycle of touch detection operation (hereinafter, referred to as the touch maximum unit number) is set in advance. When the touch maximum unit number (MAX_LOOP_NUM) is, for example, 29, the cycle of touch detection operation can be managed by using a loop counter configured to obtain 0 to 29.

Specifically, as shown in FIG. 10, the loop counter (value) is sequentially incremented from unit 0 to unit 29. In unit 30, the loop counter is reset to 0. The loop counter is incremented again from unit 31. In this way, touch detection operation (cycle) can be managed independently from display operation.

As shown in units 41 and 42 of FIG. 10, it is assumed that the loop counter is not incremented in the dummy unit (here, unit 42) since the effective unit number is set to 41, and thus, no touch detection period is set in the dummy unit.

The loop counter is incremented in neither perpendicular front porch periods FP nor perpendicular back porch periods BP. The loop counter maintains the value in each perpendicular front porch period FP and each perpendicular back porch period BP. In this way, in unit 0 (specifically, the touch detection period of unit 0) after the input of a new perpendicular synchronous signal VSYNC, the value maintained in the perpendicular front porch period FP and the perpendicular back porch period BP is incremented. Subsequently, the same operation is repeated.

In the above example, the loop counter is used since the cycle of touch detection operation is independent from (in other words, is not synchronized with) the cycle of display operation. When the cycle of touch detection operation is synchronized with the cycle of display operation, both the cycle of touch detection operation and the cycle of display operation may be managed by the unit numbers (the number of units) without using the loop counter.

In the display device DSP, power may be saved (consumed power may be reduced) by decreasing the display drive frequency in normal driving. Specifically, when the display device DSP is driven at, for example, a display drive frequency of 60 Hz in normal driving, the display device DSP may be driven at a display drive frequency of 30 Hz.

In the following explanation, driving the display device DSP at a decreased display drive frequency in normal driving is called low-speed driving (driving at low frequency).

It is assumed that the drive state is dynamically switched between normal driving and low-speed driving by the panel driver IC1 (the timing controller 107 provided in the panel driver IC1) based on the pixel data, etc., written to the video memory 103. Specifically, the I/F circuit 101 may include a frequency switch determination circuit (a first circuit), determine the switch of the frequency based on predetermined conditions and transmit the result of determination to the timing controller 107, etc. The predetermined conditions are set so as not to impair the image quality by the switch of the frequency (in other words, the switch between normal driving and low-speed driving). For example, the I/F circuit 101 may include an image analysis circuit, determine whether the current state of the display device DSP (specifically, the display panel PNL) is a state where it is unnecessary to rewrite the screen (image), for example, a state where a home screen is displayed or the same picture is displayed, and transmit a signal for switching the drive state to low-speed driving (low frequency) when it is unnecessary to rewrite the screen. The determination may be made based on the frequency of update of pixel data from the host device HOS. For example, when the host device HOS has not updated pixel data for a certain period, the display device DSP may be switched to low-speed driving. When the panel driver IC1 receives a signal for switching the drive state of the display device DSP to low-speed driving from the I/F circuit 101, the panel driver IC1 switches the drive state from normal driving to low-speed driving.

In the present embodiment, the frequency switch determination circuit (I/F circuit 101) is configured to switch the frequency of display operation to the display drive frequency (a first frequency) in normal driving or the display drive frequency (a second frequency) in low-speed driving slower than the display drive frequency of normal driving.

In the above example, the I/F circuit 101 functions as a frequency switch determination circuit. However, the data processing circuit 102 and the video memory 103 may function as a frequency switch determination circuit in cooperation with each other.

For example, the drive state may be switched between normal driving and low-speed driving in accordance with a command from the host device HOS.

When the display device DSP is driven at low speed, each frame period is longer than that of normal driving. In the present embodiment, even in low-speed driving, the length of the display period DIS and the touch detection period T in each unit is the same as that of normal driving. The present embodiment deals with the difference from a single frame period in normal driving by lengthening display adjustment periods (porch periods). In this case, for example, the timing controller 107 and the display drive circuit 108 include a porch period change circuit (a second circuit) configured to change the length of display adjustment periods in accordance with the result of determination of the frequency switch determination circuit included in the I/F circuit 101. When the result of determination of the frequency switch determination circuit is, for example, a switch to low-speed driving (low frequency), the porch period change circuit receives a switch signal indicating the result of determination from the frequency switch determination circuit and outputs a signal indicating display adjustment periods (porch periods) in low-speed driving, for example, an ENABLE signal.

In the present embodiment, the difference between the time that the writing of pixel data to the first pixel row of the frame is started and the time that the writing of pixel data to the last pixel row of the frame ends can be always maintained at a certain time in the display device DSP. Display adjustment periods include a perpendicular back porch period BP in which the polarity of image display is inverted and a perpendicular front porch period FP provided before the perpendicular back porch period. Either period may be lengthened in low-speed driving. In the present embodiment, each perpendicular front porch period FP is lengthened (extended).

Figure 12:
FIG. 12 is shown for explaining the comparison example for the present embodiment.

With reference to FIG. 11 and FIG. 12, this specification explains display operation and touch detection operation when each perpendicular front porch period FP in normal driving is simply lengthened as a comparison example for the present embodiment.

In the comparison example, as shown in FIG. 11, each perpendicular back porch period BP and each unit (including a display period DIS and a touch detection period T) are the same as those of normal driving shown in FIG. 9. However, each perpendicular front porch period FP' is longer than each perpendicular front porch period FP of normal driving.

In this case, as shown in FIG. 12, the start line of each perpendicular front porch period FP' is the same as that of each perpendicular front porch period FP of normal driving shown in FIG. 10. However, the end line is 3846, and the number of lines is 1922. Thus, they are greater than those of normal driving.

The maximum number of display lines does not differ between normal driving and low-speed driving. The number of lines of each perpendicular front porch period FP' shown in FIG. 12 does not indicate that the lines of this number are driven. Instead, the number of lines of each perpendicular front porch period FP' shown in FIG. 12 indicates that the time equivalent to the time required to drive the lines of this number is allocated to each perpendicular front porch period FP'. Similarly, the end line of each perpendicular front porch period FP' indicates that the time equivalent to the time required to drive the lines from the start line to the end line is allocated to each perpendicular front porch period FP'.

When each perpendicular front porch period FP of normal driving is lengthened, neither display operation nor touch detection operation is performed in each perpendicular front porch period FP' as shown in FIG. 11 (blanking period).

Since the operation for displaying the image of a single frame ends before a perpendicular front porch period FP', display operation does not need to be performed in the perpendicular front porch period FP'.

However, when touch detection operation is not performed in the perpendicular front porch periods FP', touch operation cannot be detected in the perpendicular front porch periods FP'. Thus, the sensitivity for touch detection in the display device DSP is decreased.

In the present embodiment, when the display device DSP operates with each frame period in low-speed driving, and further when each perpendicular front porch period is extended to FP' under the control by the panel driver IC1 (specifically, the timing controller 107 included in the panel driver IC1), a touch detection period (a second touch detection period) in which the touch detection electrodes Rx output touch detection signals Rxs by driving the drive electrodes Tx (the common electrodes COME operating as the drive electrodes Tx) is allocated to each perpendicular front porch period FP'. In the present embodiment, LP_VFP_TP_ENB for determining whether a touch detection period is allocated to each perpendicular front porch period FP' is set in advance. This LP_VFP_TP_ENB is provided by, for example, the timing controller 107 to the touch drive circuit 109, and is used as an instruction for switching the touch drive frequency. In this case, for example, the timing controller 107 and the touch drive circuit 109 includes a touch drive switch circuit (a third circuit) configured to switch the display device DSP between a state where touch driving (touch detection operation) should be performed in a display adjustment period and a state where touch driving should not be performed in a display adjustment period in accordance with the result of determination of the frequency switch determination circuit included in the I/F circuit 101. For example, when the result of determination of the frequency switch determination circuit is a switch to low-speed driving (frequency), the touch drive switch circuit receives a switch signal indicating the result of determination from the frequency switch determination circuit, and outputs a signal for performing touch driving in a display adjustment period (porch period), such as a VSHD or VSHD signal. When LP_VFP_TP_ENB indicates 1, a touch detection period is allocated to each perpendicular front porch period FP' in low-speed driving. The display device DSP may be set such that a touch detection period is not allocated to any perpendicular front porch period FP' in low-speed driving by setting LP_VFP_TP_ENB to 0.

Now, this specification explains the display operation and touch detection operation of the display device DSP in low-speed driving according to the present embodiment.

Figure 13:
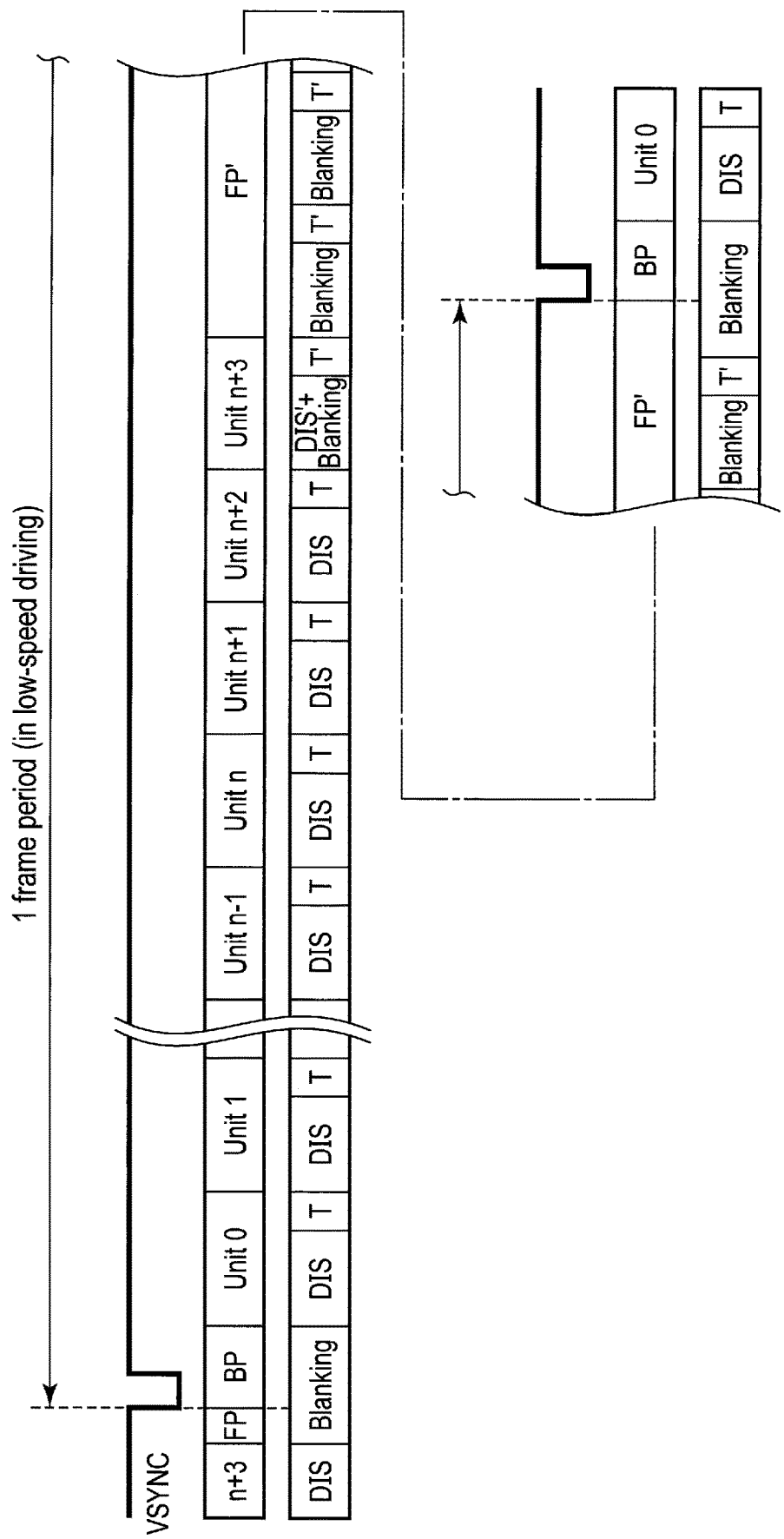
FIG. 13 is shown for explaining the arrangement of display periods and touch detection periods in low-speed driving.

With reference to FIG. 13, this specification explains the arrangement of display periods and touch detection periods in low-speed driving according to the present embodiment.

When a perpendicular synchronous signal VSYNC for display is input to the panel driver IC1 (in other words, a frame period is started) as shown in FIG. 13, display operation and touch detection operation are performed via a perpendicular back porch period. In this case, in a manner similar to that of normal driving, display operation and touch detection operation are repeated in the frame period (in other words, a display period DIS and a touch detection period T are alternately provided).

In the perpendicular front porch period FP after the last unit n+3 in FIG. 11, no touch detection period T is set. Thus, the perpendicular front porch period FP is a blanking period. However, in the present embodiment, as shown in FIG. 13, touch detection periods T' are allocated at predetermined intervals in a period including unit n+3 and the perpendicular front porch period FP'. The predetermined intervals between touch detection periods T' are explained later.

Figure 14:
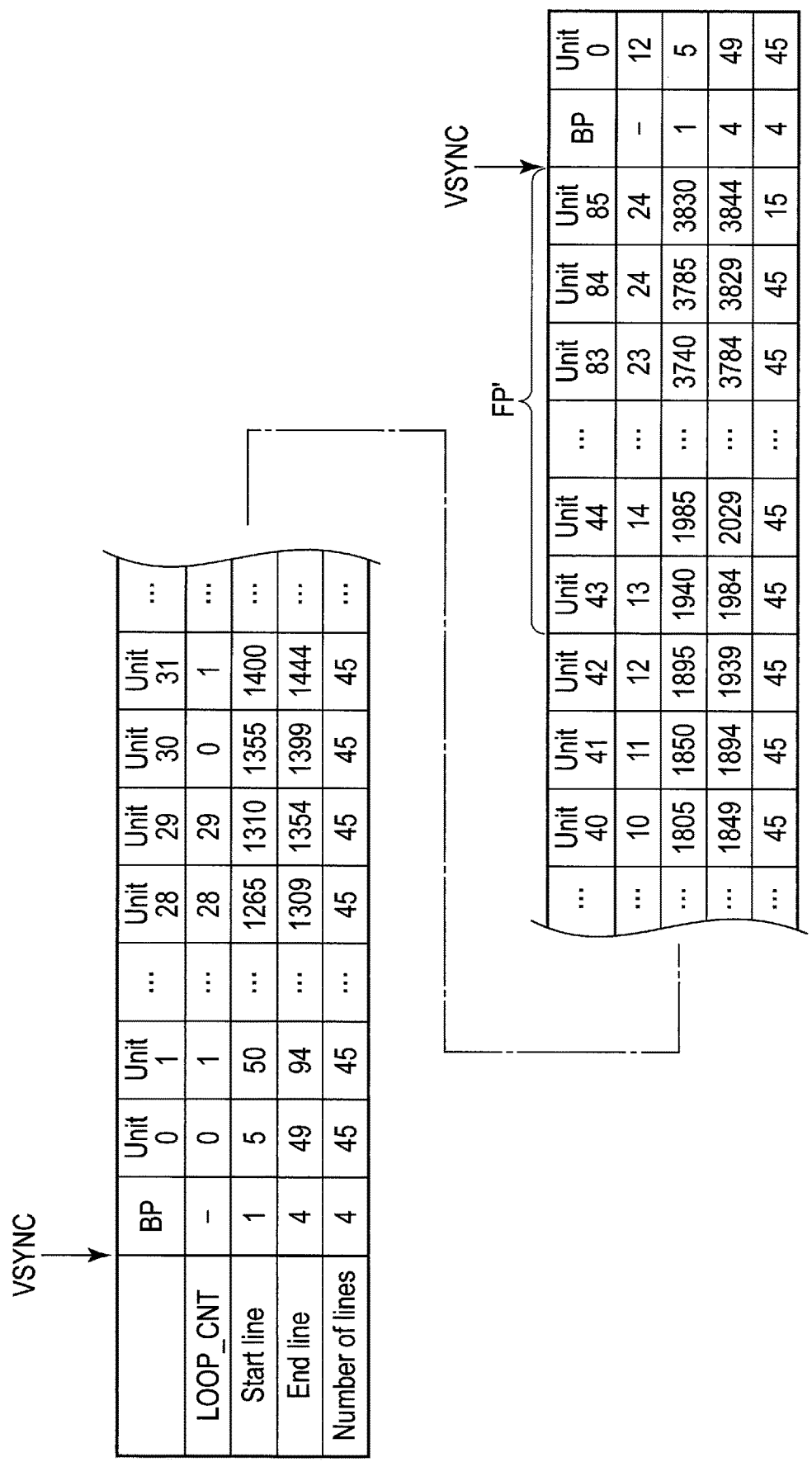
FIG. 14 is shown for specifically explaining display operation and touch detection operation in low-speed driving.

With reference to FIG. 14, this specification specifically explains display operation and touch detection operation in low-speed driving according to the present embodiment. In a manner similar to that of normal driving shown in FIG. 10, the number of display lines in each unit is set to 45.

The perpendicular back porch periods BP and units 0 to 41 shown in FIG. 14 are the same as those in FIG. 10, detailed description thereof being omitted.

Unit 42 shown in FIG. 14 corresponds to unit 42 shown in FIG. 10 (hereinafter, referred to as unit 42 of normal driving). However, unit 42 shown in FIG. 14 (hereinafter, referred to as unit 42 of low-speed driving) is different from unit 42 of normal driving in terms of the start line, the end line and the number of lines. While display operation (display period DIS') for the remaining lines of the lines driven in the display periods to unit 41 (in other words, lines less than the lines of the number of display lines in each unit) is allocated to unit 42 of normal driving, display operation (display period DIS') for the lines as the remaining lines and a touch detection period T' are allocated to unit 42 of low-speed driving as shown in FIG. 14.

Since the number of lines driven in the display period DIS' included in unit 42 of low-speed driving is less than the number of display lines in each unit, the display period DIS' is shorter than the display periods DIS included in units 0 to 41 set before unit 42 in the single frame period. Thus, in unit 42 of low-speed driving, a predetermined blanking period is added to the display period DIS'.

The length of the display period DIS' included in unit 42 of low-speed driving and the blanking period added to the display period DIS' is the same as the length of the display period DIS included in each of the other units 0 to 41. The length of the touch detection period T' included in dummy unit 42 of low-speed driving is the same as the length of the touch detection period T included in each of the other units 0 to 41.

In this way, the length of the display period DIS', blanking period and touch detection period T' included in unit 42 of low-speed driving is the same as the length of the display period DIS and touch detection period T included in each of the other units 0 to 41.

A perpendicular front porch period FP' extended to correspond to low-speed driving is set after unit 42 of low-speed driving (a display period DIS', a blanking period and a touch detection period T'). In the present embodiment, a plurality of units 43 to 85 are set in the perpendicular front porch period FP'. Each of units 43 to 84 set in the perpendicular front porch period FP' includes a blanking period having a length equal to the length of the above display period DIS and a touch detection period T'. The length of each of units 43 to 85 (the blanking period and the touch detection period T' included in each of units 43 to 85) is the same as the length of each of the other units 0 to 42.

In this way, in the present embodiment, touch detection periods T' are provided at intervals equal to touch detection periods T in each perpendicular front porch period FP'. Thus, the arrangement of touch detection periods T' can be managed based on each unit (the unit numbers). The cycle of touch detection operation in low-speed driving is managed by using the loop counter described above in a manner similar to that of normal driving.

Unit 85 shown in FIG. 14 is provided to adjust each frame period in low-speed driving, and is, for example, a unit including only a blanking period. In the example shown in FIG. 14, 84 is set in advance as the effective unit number (LP_VALID_UNIT_NUM) in low-speed driving.

The explanation regarding the perpendicular front porch period FP' shown in FIG. 12 is applicable to the start line, the end line and the number of lines of unit 42 and each of the subsequent units shown in FIG. 14. For the sake of convenience, FIG. 14 shows that a blanking period equivalent to the display period in which the display lines in each unit (here, forty five display lines) are driven and a touch detection period T' are included in each of the units.

Figure 15:
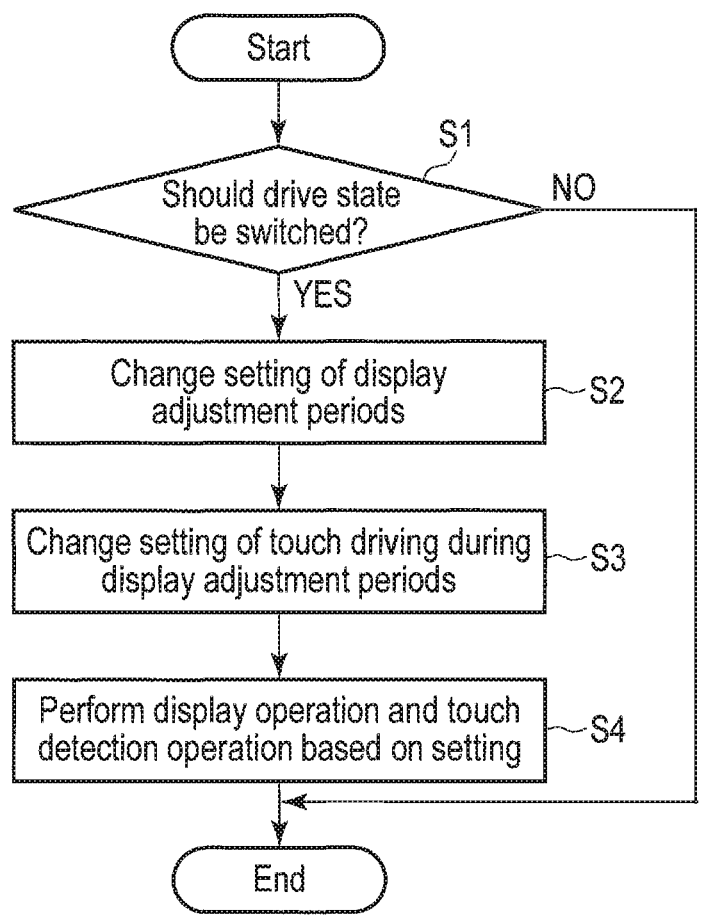
FIG. 15 is a flowchart showing an example of a processing procedure of the display device when the drive state is switched.

Now, this specification briefly explains the outline of the processing procedure of the display device DSP of the present embodiment when the drive state of the display device DSP is switched with reference to the flowchart of FIG. 15. Here, the drive state of the display device DSP is normal driving.

In the present embodiment, the frequency switch determination circuit included in the I/F circuit 101 determines whether the drive state of the display device DSP should be switched based on the above predetermined conditions (step S1).

The predetermined conditions include, for example, whether it is unnecessary to rewrite the screen of the display device DSP. When the drive state of the display device DSP is normal driving as described above, and further when it is unnecessary to rewrite the screen of the display device DSP, it is determined that the drive state of the display device DSP should be switched since effect such as the reduction in image quality is less even in low-speed driving. When the screen of the display device DSP needs to be rewritten, it is determined that the drive state of the display device DSP should not be switched since an effect of impairing the image quality is large in low-speed driving.

When it is determined that the drive state of the display device DSP should not be switched (NO in step S1), the process of FIG. 15 is terminated. The current drive state is maintained, and display operation and touch detection operation are performed.

When it is determined that the drive state of the display device DSP should be switched (YES in step S1), the frequency switch determination circuit transmits a switch signal indicating the result of determination (specifically, a signal indicating that the drive state should be switched) to the timing controller 107.

The timing controller 107 receives the switch signal transmitted by the frequency switch determination circuit. When the switch signal is received in the timing controller 107, the porch period change circuit realized by the cooperation between the timing controller 107 and the display drive circuit 108 changes the current setting of display adjustment periods (length) (step S2). Here, display adjustment periods in current normal driving are changed to display adjustment periods in low-speed driving (in other words, display adjustment periods are extended).

In this case, the porch period change circuit outputs a signal indicating display adjustment periods in low-speed driving to the display panel PNL.

When the switch signal is received in the timing controller 107 as described above, the touch drive switch circuit realized by the cooperation between the timing controller 107 and the touch drive circuit 109 changes the setting of touch driving (touch detection operation) during display adjustment periods (step S3).

When the drive state of the display device DSP is normal driving, touch detection operation is not performed during any display adjustment period as described above (in other words, touch driving during display adjustment periods is set to OFF). Thus, touch driving during display adjustment periods is changed to ON. In this case, the touch drive switch circuit outputs a signal for performing touch detection operation during display adjustment periods to the display panel PNL.

In the display panel PNL, display operation and touch detection operation are performed (controlled) based on the setting changed in steps S2 and S3 (the signals output by the porch period change circuit and the touch drive switch circuit) (step S4). In this manner, the drive state of the display device DSP is switched from normal driving to low-speed driving. Further, touch detection operation can be performed during display adjustment periods in low-speed driving.

In the above description, the drive state of the display device DSP when the process shown in FIG. 15 is performed is normal driving. However, the same explanation is applicable to a case where the drive state of the display device DSP when the process is performed is low-speed driving.

Specifically, when the drive state of the display device DSP is low-speed driving, and further when, for example, the screen of the display device DSP needs to be rewritten, it is determined that the drive state of the display device DSP should be switched in step S1.

In this case, display adjustment periods (setting) in low-speed driving are changed to display adjustment periods in normal driving in step S2. Touch driving during display adjustment periods is changed to OFF in step S3. In step S4, display operation and touch detection operation are performed based on the setting changed in the above manner (in other words, the drive state of the display device DSP is switched from low-speed driving to normal driving).

The process of FIG. 15 (the process of step S1) is regularly performed. Thus, in the present embodiment, it is possible to dynamically switch the drive state of the display device DSP and perform display operation and touch detection operation in accordance with the drive state.

Now, this specification briefly explains various signals related to display operation and touch detection operation in the present embodiment.

Figure 16:
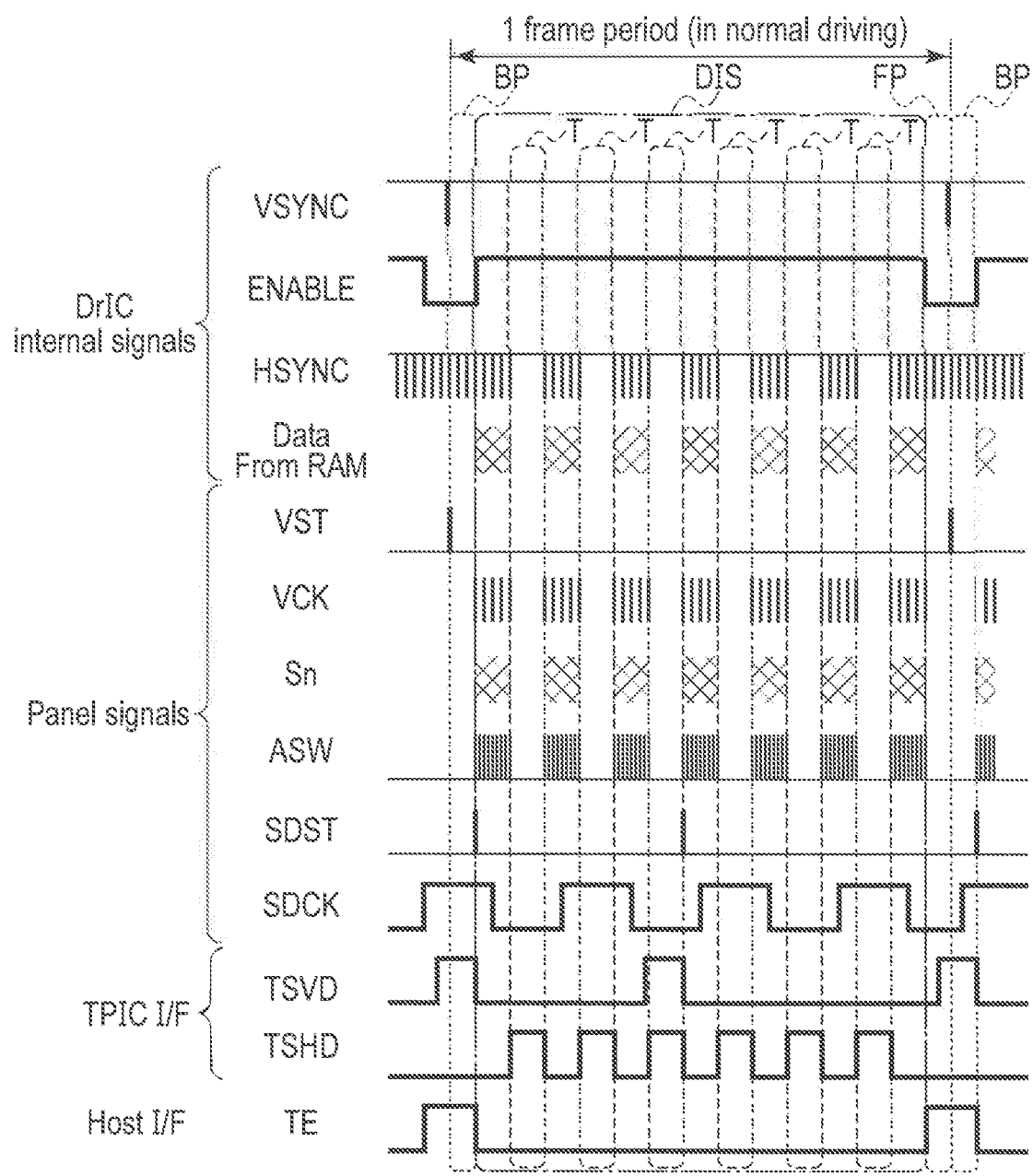
FIG. 16 is a timing chart showing the relationship of various signals related to display operation and touch detection operation in normal driving.

FIG. 16 is a timing chart showing the relationship of various signals related to display operation and touch detection operation in normal driving. In FIG. 16, for example, units are simplified for the sake of convenience. However, each frame period includes a perpendicular back porch period BP, and a period in which display periods DIS and touch detection periods T are alternately provided in units, and a perpendicular front porch period FP.

In FIG. 16, VSYNC, ENABLE, HSYNC and Data are shown as the internal signals of the panel driver IC1.

VSYNC is a perpendicular synchronous signal (image) indicating the start of a frame period (the cycle of display operation). ENABLE is an enable signal (image) indicating that a pixel signal can be written to display pixels PX. HSYNC is a horizontal synchronous signal (image) indicating the timing of display operation based on each line on the screen of one frame. Data indicates pixel data read from the video memory 103.

According to the internal signals of the panel driver IC1 shown in FIG. 16, the enable signal is at high level a predetermined time after the input of VSYNC, and pixel data is read from the video memory 103 based on the horizontal synchronous signal in each display period DIS in each frame period.

FIG. 16 also shows VST, VCK, Sn, ASW, SDST and SDCK as the signals (panel signals) input to the display panel PNL.

VST is a gate circuit start pulse (image). VCK is a gate circuit shift clock (image). VST and VCK are signals for controlling the gate driver GD provided in the display panel PNL. Sn is source output, and indicates a pixel signal input from the panel driver IC1 to the display panel PNL and written to a display pixel PX via a signal line S. ASW is a multiplexer control switch, and indicates a signal for selecting, for example, RGB. SDST is a touch detection start pulse. SDCK is a touch detection clock. SDST and SDCK are control signals related to touch detection as described above.

When the panel signals (VST, VCK, Sn and ASW) are input to the display panel PNL at the timing shown in FIG. 16, display pixels PX corresponding to the display lines in each unit are driven (in other words, pixel signals are written to the display pixels PX) in synchronization with the above horizontal synchronous signal in a corresponding display period DIS. SDST indicates the start of the above cycle of touch detection operation. In the example shown in FIG. 16, two cycles of touch detection operation are performed in each frame period. SDCK is input in accordance with the arrangement of the touch detection periods T included in the units. According to these SDST and SDCK, the drive electrodes Tx (common electrodes COME) selected by the SDST and SDCK are driven in the touch detection periods T.

FIG. 16 further shows TSVD and TSHD as the signals (TPIC I/F) input to the touch driver IC2. TSVD and TSHD are signals (a perpendicular synchronous signal and a horizontal synchronous signal) for synchronizing the panel driver IC1 with the touch driver IC2. TSVD is input based on the start of the above cycle of touch detection operation.

TSHD is input so as to correspond to the touch detection periods T included in each unit.

The touch driver IC2 is capable of detecting the touch position from the touch detection signal output from a touch detection electrode Rx in a touch detection period T based on the TSVD and TSHD input at the timing shown in FIG. 16.

FIG. 16 shows TE as a signal (HOST I/F) input to the host device HOS. TE is a VSYNC signal (master synchronous signal) input from the panel driver IC1 to the host device HOS. Although not shown in FIG. 16, the touch position detected by the touch driver IC2 is output to the host device HOS. In the display device DSP, synchronized operation is realized between the panel driver IC1, the touch driver IC2 and the host device HOS by using a VSCYNC signal (master synchronous signal), TSVD, TSHD, etc.

Figure 17:
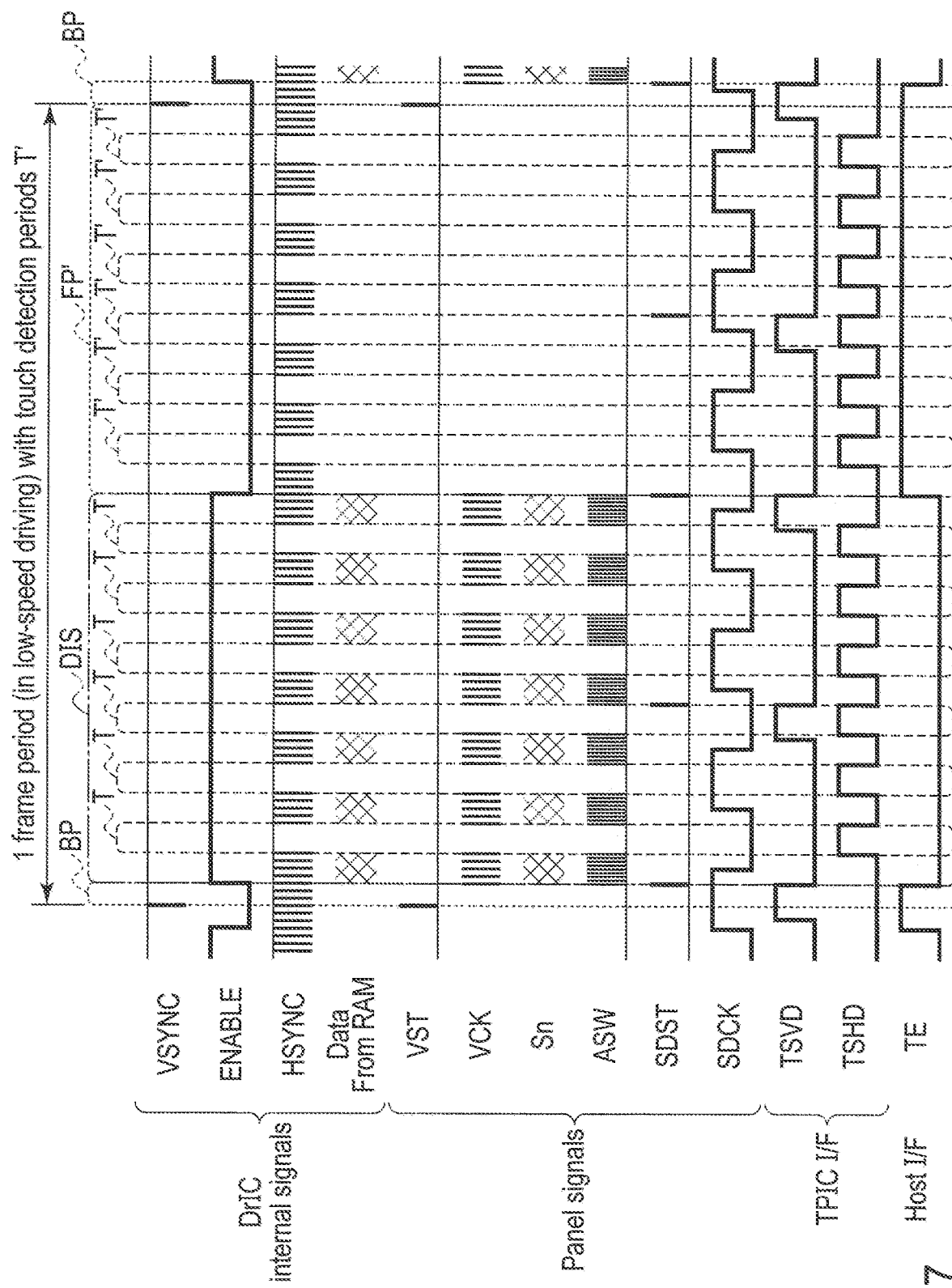
FIG. 17 is a timing chart showing the relationship of various signals related to display operation and touch detection operation in low-speed driving according to the present embodiment.
Figure 18:
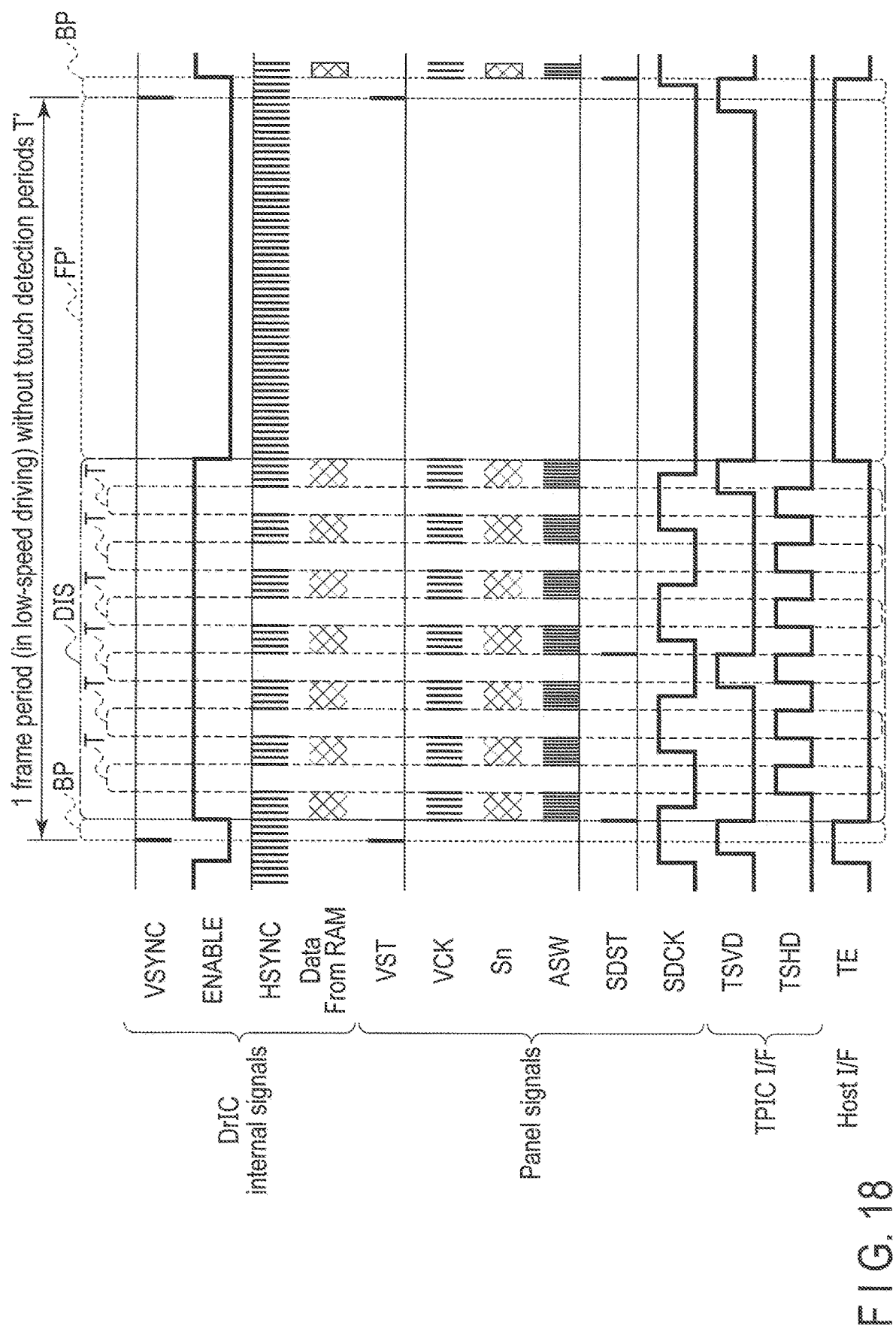
FIG. 18 is a timing chart showing the relationship of various signals related to display operation and touch detection operation in low-speed driving in the comparison example.

FIG. 17 is a timing chart showing the relationship of various signals related to display operation and touch detection operation in low-speed driving according to the present embodiment. FIG. 18 is a timing chart showing the relationship of various signals related to display operation and touch detection operation in low-speed driving in the above comparison example. The detailed description of the same portions as FIG. 16 is omitted here.

As shown in FIG. 17, touch detection periods T' are set in a perpendicular front porch period FP' in low-speed driving in the present embodiment in comparison with FIG. 18. Specifically, in the perpendicular front porch period FP', SDST and SDCK are input to the display panel PNL as panel signals, and TSVD and TSHD are input to the touch driver IC2.

In the present embodiment, touch detection operation is performed even in the touch detection periods T' arranged at the same intervals as the touch detection periods T in the perpendicular front porch period FP' extended by low-speed driving.

As described above, according to the present embodiment, each perpendicular front porch period FP (display adjustment period) is extended to a perpendicular front porch period FP' when the display device DSP is driven at low speed with frame periods (second frame periods) each longer than each frame period (first frame period) of normal driving. Touch detection periods T' (second touch detection periods) are allocated to each perpendicular front porch period FP'.

Since the present embodiment is configured as described above, even when each perpendicular front porch period FP' in low-speed driving is longer than that in normal driving, touch operation can be detected in each perpendicular front porch period FP'. In the present embodiment, power consumption can be reduced by driving the display device DSP at low speed. Further, the decrease in the sensitivity for touch detection can be prevented even in low-speed driving.

In the present embodiment, the length of the display periods DIS and touch detection periods T included in each frame period in low-speed driving is the same as the length of the display periods DIS and touch detection periods T included in each frame period in normal driving. Since the present embodiment is configured in this way, the display device DSP can be driven at low speed while maintaining the image quality of normal driving. Further, there is no need to change display operation between normal driving and low-speed driving. Thus, control regarding display operation can be simplified.

In the present embodiment, for example, normal driving (first frame periods) can be dynamically switched to low-speed driving (second frame periods) when it is unnecessary to rewrite an image based on the pixel data written to the video memory 103. In the present embodiment, power can be saved by dynamically switching the drive state to low-speed driving.

In the present embodiment, display periods DIS and touch detection periods T are alternately provided in each frame period. Touch detection periods T' allocated to each perpendicular front porch period FP' in each frame period in low-speed driving have the same length as touch detection periods T, and are arranged at the same intervals as touch detection periods T. Since the present embodiment is configured in this way, the display device DSP can be driven at low speed while stabilizing the cycle of touch detection operation in normal driving (the drive frequency of touch driving).

In the present embodiment, it is possible to set touch detection operation so as to improve the sensitivity for touch detection in low-speed driving by the structure of controlling (managing) the cycle of touch detection operation (touch driving) independently from the cycle of display operation.

In the present embodiment, the common electrodes for display are used as the drive electrodes for touch detection. In other words, the drive electrode are applied display drive voltage as display operation in display periods, and the drive electrodes are applied touch drive voltage as touch detection operation in touch detection periods. Thus, the thickness of the display device DSP can be reduced. Further, the image quality can be improved.

In the present embodiment, touch detection periods T' are allocated to each extended front porch period FP' in low-speed driving. Thus, after the polarity is inverted, the time required to complete writing an image can be made constant. Alternatively, for example, each perpendicular back porch period BP may be extended in low-speed driving, and touch detection periods T' may be allocated to each extended perpendicular back porch period BP.

In the above embodiment, the common electrodes COME are provided along the scanning lines G. However, the present embodiment may be applied to a display device DSP in which the common electrodes COME are provided along the signal lines S. The present embodiment may be applied to any display device DSP as long as each frame period includes a display period, a touch detection period and a display adjustment period, and the display adjustment period is extended in low-speed driving, etc. The present embodiment is not limited to the shape of the common electrodes COME, etc. For example, the present embodiment may be applied to a structure in which a common electrode (having a block shape) is provided for each display pixel. In the above embodiment, the touch detection mechanism SE is structured as a mutual capacitive detection system including drive electrodes and detection electrodes. However, the touch detection mechanism SE may be structured as a self-capacitive detection system. In the self-capacitive detection, for example, a plurality of common electrodes are arranged in matrix to detect the change in electrode capacity between a touch and a non-touch for each common electrode. In the above embodiment, the display device DSP includes the in-cell touch detection mechanism SE. However, the present embodiment may be applied to a display device DSP including an on-cell touch detection mechanism. Further, the display panel PNL of the above embodiment is a transmissive type liquid crystal display device including a backlight. However, as described above, the display panel PNL may be a reflective type liquid crystal display device. Further, the display panel PNL is not limited to a panel using a liquid crystal layer, and may be, for example, an organic electroluminescent panel. In the organic electroluminescent panel, the common electrodes COME may face the pixel electrodes of organic electroluminescent elements via an organic light-emitting layer to form drive electrodes.

The display device DSP (the display device having a touch detection function) of the present embodiment may be incorporated into various electronic devices. The electronic devices into which the display device DSP is incorporated include, for example, television devices, digital cameras, video cameras, notebook computers, tablet computers, smartphones (mobile phones) and in-vehicle displays. The display device DSP of the present embodiment may be incorporated into electronic devices displaying an image (video) in various fields.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device having a touch detection function, comprising:
   a display panel configured to perform a display operation based on a pixel signal in a display period;
   a detector configured to perform a touch detection operation in touch detection periods including a first touch detection period and a second touch detection period; and
   a driver configured to control frame operations including a first frame operation and a second frame operation, each of the frame operations being an operation for displaying an image of a single frame,
   wherein
   the driver is configured to:
     control the first frame operation in a first frame period including the display period, the first touch detection period and a first display adjustment period; and
     control the second frame operation in a second frame period including the display period, the first touch detection period and a second display adjustment period,
   the second display adjustment period is longer than the first display adjustment period,
   the second display adjustment period includes the second touch detection period,
   the first touch detection period is divided into a plurality of first touch detection sub-periods,
   the second touch detection period includes at least one second touch detection sub-period,
   a length of each of the first touch detection sub-periods is the same as a length of the at least one second touch detection sub-period, and
   the driver is configured to control such that
     the plurality of first touch detection sub-periods are provided at a first interval,
     the at least one second touch detection sub-period is a plurality of second touch detection sub-periods provided at the first interval in the second display adjustment period.

2. The display device of claim 1, wherein
   the driver is configured to control such that a length of the display period and the first touch detection period included in the second frame period is equal to a length of the display period and the first touch detection period included in the first frame period.

3. The display device of claim 1, wherein
   the driver is configured to control such that the touch detection operation is not performed in the first display adjustment period.

4. The display device of claim 1, further comprising a memory to which pixel data is written from outside, wherein
   the display panel is configured to perform the display operation based on a pixel signal generated from the pixel data written to the memory, and
   the driver is configured to perform the first frame operation or the second frame operation based on the pixel data written to memory.

5. The display device of claim 1, wherein
   the detector comprises a plurality of drive electrodes to which a touch drive voltage is applied in the touch detection periods, and
   the driver is configured to control a cycle for applying the touch drive voltage to the drive electrodes independently from a cycle for displaying the image of a single frame.

6. The display device of claim 5, wherein
   the display panel comprises a plurality of common electrodes to which a display drive voltage is applied in the display period, and
   the common electrodes are used as the drive electrodes.

7. The display device of claim 1, wherein
   each of the first display adjustment period and the second display adjustment period includes a perpendicular back porch period for inverting a polarity of display of the image, and a perpendicular front porch period provided before the perpendicular back porch period, and
   the driver is configured to
     extend the perpendicular front porch period of the second display adjustment period, and
     allocate the second touch detection period to the extended perpendicular front porch period.

8. A method comprising:
   performing a display operation for displaying an image based on a pixel signal in a display period;
   performing a touch detection operation in touch detection periods including a first touch detection period and a second detection period; and
   controlling frame operations including a first frame operation and a second frame operation, each of the frame operations being an operation for displaying an image of a single frame,
   wherein
   the controlling frame operations comprises:
     controlling the first frame operation in a first frame period including the display period, the first touch detection period and a first adjustment period; and
     controlling the second frame operation in a second frame period including the display period, the first touch detection period and a second adjustment period,
   the second display adjustment period is longer than the first display adjustment period,
   the second display adjustment period includes the second touch detection period,
   the first touch detection period is divided into a plurality of first touch detection sub-periods, the second touch detection period includes at least one second touch detection sub-period,
a length of each of the first touch detection sub-periods is the same as a length of the at least one second touch detection sub-period,
controlling the second frame operation comprises:
  performing the touch detection operation in the plurality of first touch detection sub-periods, and
  performing the touch detection operations in a plurality of the second touch detection sub-periods, and
the first touch detection sub-periods and the second touch detection sub-periods are arranged at a same interval.

9. The method of claim 8, wherein
a length of the display period and the first touch detection period included in the second frame period is equal to a length of the display period and the first touch detection period included in the first frame period.

10. The method of claim 8, wherein
the controlling the first frame operation does not comprise performing the touch detection operation in the first display adjustment period.

11. The method of claim 8, further comprising writing pixel data from outside to a memory, wherein
  the performing the display operation comprises performing the display operation based on a pixel signal generated from the pixel data written to the memory, and
  the controlling the frame operations comprises performing the first frame operation or the second frame operation based on the pixel data written to the memory.

12. The method of claim 8, wherein
the performing the touch detection operation comprises controlling a cycle for applying a touch drive voltage to a plurality of drive electrodes to which the touch drive voltage is applied in the touch detection periods such that the cycle is independent from a cycle for displaying the image of a single frame.

13. The method of claim 12, wherein
the performing display operation comprises applying a display drive voltage to the drive electrode in the display period.

14. The method of claim 8, wherein
each of the first display adjustment period and second display adjustment period comprises a perpendicular back porch period for inverting a polarity of display of the image, and a perpendicular front porch period provided before the perpendicular back porch period, and
the controlling the second frame operation comprises:
  extending the perpendicular front porch period; and
  allocating the second touch detection period to the extended perpendicular front porch period.

15. The display device of claim 1, wherein
the first display adjustment period does not include the first touch detection period.

16. The display device of claim 1, wherein
the second touch detection period is divided into the plurality of the second touch detection sub-periods.

17. The display device of claim 1, wherein
a period, to which a display period and a touch detection period for lines of fractions of the lines driven in the display period are allocated, is set before the second display adjustment period.

* * * * *